United States Patent [19]
Kuwabara et al.

[11] Patent Number: 5,844,194
[45] Date of Patent: Dec. 1, 1998

[54] RESISTANCE WELDING ELECTRODE AND METHOD OF MANUFACTURING SAME

[75] Inventors: Mitsuo Kuwabara; Kiyoshi Ikegami; Tomohiko Ito; Teruaki Yoshida, all of Sayama, Japan

[73] Assignee: Honda Giken Kogyo Kabushiki Kaisha, Tokyo, Japan

[21] Appl. No.: 668,008

[22] Filed: Jun. 19, 1996

Related U.S. Application Data

[63] Continuation of Ser. No. 319,583, Oct. 7, 1994.

[30] Foreign Application Priority Data

Oct. 8, 1993 [JP] Japan .................................. 5-252966

[51] Int. Cl.⁶ .............................. B23K 35/04; B23K 11/30
[52] U.S. Cl. ............................................ 219/119; 219/118
[58] Field of Search ..................................... 219/118, 119, 219/120

[56] References Cited

U.S. PATENT DOCUMENTS

| | | | |
|---|---|---|---|
| 3,592,994 | 7/1971 | Ford | 219/119 |
| 4,476,372 | 10/1984 | Prucher | 219/119 |
| 4,591,687 | 5/1986 | Urech . | |
| 4,843,206 | 6/1989 | Azuma et al. . | |

FOREIGN PATENT DOCUMENTS

| | | | |
|---|---|---|---|
| 554720 | 7/1932 | Germany | 219/119 |
| 1938548 | 2/1970 | Germany | 219/119 |
| 58-159986 | 9/1983 | Japan . | |
| 59-118287 | 7/1984 | Japan . | |
| 64-78683 | 3/1989 | Japan . | |
| 6-210463 | 2/1994 | Japan . | |
| 941094 | 7/1982 | U.S.S.R. | 219/119 |

Primary Examiner—Teresa J. Walberg
Assistant Examiner—J. Pelham
Attorney, Agent, or Firm—Birch, Stewart, Kolasch & Birch, LLP

[57] ABSTRACT

A resistance welding electrode for supplying a current to metal workpieces to weld the workpieces to each other includes an electrode body as an electrode matrix of a copper alloy and a plurality of filamentary members embedded in the electrode matrix parallel to the direction in which a current flows therethrough. The filamentary members have respective tip ends exposed as lands on a surface of a tip end of the electrode body. The filamentary members are made of a material having an electric conductivity different from that of the electrode matrix. The exposed tip ends of the filamentary members having a total area which is in the range of 0.5 to 40% of the entire area of the tip end of the electrode body.

18 Claims, 16 Drawing Sheets

RESISTANCE WELDING ELECTRODE AND METHOD OF MANUFACTURING SAME

This application is a continuation, of application Ser. No. 08/319,583 filed on Oct. 7, 1994, now abandoned.

BACKGROUND OF THE INVENTION

1. Field of the Invention

The present invention relates to a resistance welding electrode for use in welding metal plates made of aluminum, magnesium, or an alloy thereof, and a method of manufacturing such a resistance welding electrode.

2. Description of the Related Art

For welding metal plates, superposed regions of the metal plates are inserted between a pair of confronting electrodes of a welding apparatus, the electrodes are pressed against the superposed regions of the metal plates, and an electric energy is supplied through the electrodes to the superposed regions of the metal plates to heat the superposed regions due to the electric resistance of the metal plates for thereby fusing the metal plates to each other. Heretofore, electrodes which have been used to resistance weld relatively soft metal workpieces such as metal plates made of aluminum, magnesium, or an alloy thereof have spherical convex tip ends for preventing deformations or cracks from being developed around the welded regions of the workpieces.

When metal plates made of aluminum, magnesium, or an alloy thereof are resistance-welded by the conventional electrode, however, the electrode is locally overheated, and a mass of molten metal of the metal plates tends to adhere to the overheated region of the electrode. Another problem is that the overheated region of the electrode itself is liable to be broken or damaged. As a result, the electrode cannot be used continuously for a long period of time.

Resistance welding of metal plates made of aluminum, magnesium, or an alloy thereof with the conventional electrode requires a consumption of large welding current in many cycles. However, galvanized steel plates, which are more electrically conductive than the above metal plates, can be resistance-welded with a lower current. Consequently, it is difficult to carry out resistance welding of metal plates made of aluminum, magnesium, or an alloy thereof with the same voltage line as resistance welding of galvanized steel plates.

SUMMARY OF THE INVENTION

It is an object of the present invention to provide a resistance welding electrode for welding metal plates made of aluminum, magnesium, or an alloy thereof with a lower current in fewer cycles, and a method of manufacturing such a resistance welding electrode.

Research efforts which have been made by the inventors in order to achieve the above object indicate that the foregoing problems encountered in resistance-welding metal plates of aluminum, magnesium, or their alloy with the conventional resistance welding electrodes are considered to be caused by the presence of oxide films on the surfaces of the metal plates. The oxide films are irregular films produced by oxidization in the air of the surface of the metal plates, and act as an insulation.

When the electrodes are pressed against the metal plates covered with the oxide films, cracks are developed in weak or fragile areas, such as thin areas, of the oxide films. Since a current is supplied through the cracks to the metal plates, the welding current concentrates in the cracks, excessively heating the cracked areas of the oxide films. Because the supplied welding current is limited to the cracked areas, the metal plates can only be welded with a large welding current in many cycles.

A study by the inventors of the resistance welding process using the conventional resistance welding electrodes has shown that a damage caused by excessive heating appears as an annular pattern along the outer edge of the electrodes. The inventors have also found out that first fused spots start to be formed in a region of the metal plates which corresponds to the damage on the electrode, and then are enlarged toward the center to form a nugget progressively in successive are cycles.

Generally, when a current flows through a filamentary conductor, the current density is highest near the surface of the conductor, and lower within the conductor, a phenomenon called a "skin effect". If a high current density is developed in an annular pattern along the outer edge of a resistance welding electrode due to the skin effect, then the annular damage appearing along the outer edge of the electrode can be attributed to the fact that a current is supplied from a high-current-density area to metal plates in a welding process by a plasma discharge, for example, irrespective of the fragility of the oxide films.

As a result of a further study based on the above finding, the inventors have also found out that if a plurality of members having an electric conductivity different from that of an electrode matrix of a resistance welding electrode are exposed on the surface of the tip end of the electrode matrix such that the total area of the exposed tip ends of the members has a certain ratio to the entire area of the tip end of the electrode matrix, then the resistance welding electrode can have scattered areas of high current density, and hence can weld workpieces or metal plates with a low current in few cycles.

To achieve the above object, there is provided in accordance with the present invention a resistance welding electrode for supplying a current to metal workpieces to weld the workpieces is to each other, comprising an electrode matrix of a copper alloy and a plurality of filamentary members embedded in the electrode matrix parallel to a direction in which a current flows therethrough and having respective tip ends exposed as lands on a surface of a tip end of the electrode matrix, the filamentary members being made or a material having an electric conductivity different from that of the electrode matrix, the exposed tip ends of the filamentary members having a total area which is in the range of 0.5 to 40% of the entire area of the tip end of the electrode matrix.

When a current is supplied to the resistance welding electrode according to the present invention to weld metal plates, the current is dispersed by the filamentary members embedded parallel to the direction in which the current flows, producing areas of high current density around the filamentary members whose tip ends are exposed as lands on the surface of the tip end of the electrode matrix. A welding current is then supplied from the areas of high current density to the metal plates. Since the areas of high current density are scattered on the tip end of the electrode matrix, first fused spots start being produced in a region of the metal plates to be welded, at many locations corresponding to the areas of high current density. In the region of the metal plates to be welded, the fused spots are grown and joined with each other in successive cycles, producing a nugget.

Since the filamentary members having an electric conductivity different from that of the electrode matrix, are embedded in the electrode matrix, the electrode matrix is heated near the filamentary members due to the resistance to the current flowing through the electrode. However, because the exposed tip ends of the filamentary members have a total area which is in the range of 0.5 to 40% of the entire area of the tip end of the electrode matrix, the amount of heat produced by the electrode matrix is relatively small, preventing the resistance welding electrode from adhering to the metal plates being welded.

If the total area of the exposed tip ends of the filamentary members were smaller than 0.5% of the entire area of the tip end of the electrode matrix, then sufficiently scattered areas of high current density would not be produced. If the total area of the exposed tip ends of the filamentary members were greater than 40% of the entire area of the tip end of the electrode matrix, then since areas where the current passes are reduced, the resistance welding electrode would not be able to weld the metal plates with a lower current in fewer cycles, and in addition, the amount of heat produced by the electrode matrix around the exposed tip ends of the filamentary members would be so large that the resistance welding electrode would easily adhere to the metal plates being welded.

The electrode matrix may be made of an alloy containing Cu, e.g., an Cr—Cu alloy, an Ag—Cu alloy, a Cu—W—Ag alloy, a Cu—Cd alloy, a Cu—Zr alloy, a Cu—Zr—Cr alloy, a Cu—Nb alloy, a Cu—Cr—Nb alloy, or an $Al_2\,O_3$—Cu alloy.

Inasmuch as areas of high current density may be scattered in many locations on the surface of the rip end of the electrode matrix, the filamentary members may made of a material having an electric conductivity lower or higher than that of the electrode matrix insofar as the electric conductivity of the filamentary members are different from that of the electrode matrix.

The material having an electric conductivity lower than that of the electrode matrix may comprise a material selected from the group consisting of silicon nitride, kaolinite, and alumina, or a material selected from the group consisting of a non-metallic inorganic material, an intermetallic compound, and a metal.

The non-metallic inorganic material may comprise a material selected from the group consisting of TiC and $TiB_2$. The intermetallic compound may comprise a material selected from the group consisting of TiAl and $Ni_3Al$. The metal may comprise a material selected from the group consisting of Fe (including steel and stainless steel), Ni, Cr, Co, V, Mo, Zr, Ti, and W.

The material having an electric conductivity higher than that of the electrode matrix may comprise a material selected from the group consisting of Ag, Cu, and a sintered Cr—Cu alloy.

The filamentary members should preferably be spaced at equal distances from each other. With the filamentary members spaced at equal distances from each other, areas around the exposed tip ends of the filamentary materials are equal to each other, thereby equalizing the densities of currents scattered by the filamentary members.

A current is actually the movement of electrons. Electrons are negatively charged particles, and the current is defined as flowing in a direction opposite to the direction in which the electrons move. When metal plates are resistance-welded with a direct current by the resistance welding electrode according to the present invention, the resistance welding electrode according to the present invention is employed as a cathode electrode which supplies electrons, which is advantageous because electrons are directly discharged from areas of high current density scattered in many locations on the surface of the tip end of the electrode matrix. If the resistance welding electrode according to the present invention were also employed as an anode electrode for receiving electrons, the electrons discharged from the areas of high current density on the cathode electrode would be limited to areas of high current density on the anode electrode, with the result that the current would be limited and not flow sufficiently.

When metal plates are resistance-welded with an alternating current by the resistance welding electrode according to the present invention, the resistance welding electrode according to the present invention is employed as one of the electrodes that are used. This is advantageous because electrons are directly discharged from areas of high current density scattered in many locations on the surface of the tip end of the electrode matrix when the resistance welding electrode supplies electrons. It the resistance welding electrode according to the present invention were also employed each as the other electrode, the electrons discharged from the areas of high current density on the electron-emitting electrode would be limited to areas of high current density on the electron-receiving electrode, with the result that the current would be limited and not flow sufficiently.

The resistance welding electrode according to the present invention might be manufactured by shaping an electrode matrix to a predetermined diameter and also shaping a plurality of filamentary materials made of a material having an electric conductivity different from that of the electrode matrix to a predetermined diameter, defining thin holes in the electrode matrix, inserting the filamentary materials into the respective holes, thereby forming an electrode blank, and staking or thermally shrinking the electrode blank. With such a manufacturing process, however, it would not be easy to manufacture the resistance welding electrode, as because the material having an electric conductivity different from that of the electrode matrix would have to be machined into thin filamentary members, and thin holes would have to be defined in the electrode matrix.

According to the present invention, there is provided a method of manufacturing a resistance welding electrode for supplying a current to metal workpieces to weld the workpieces to each other, comprising the steps of shaping an electrode matrix as a cylinder having a diameter greater than the resistance welding electrode, defining a plurality of holes In the electrode matrix parallel to a direction in which a current flows therethrough such that the total cross-sectional area or the holes is in the range of 0.5 to 40% of the cross-sectional area of the electrode matrix after the resistance welding electrode is formed, filling a powder of a material having an electric conductivity different from that of the electrode matrix in the holes thereby to form an electrode blank, drawing the electrode blank until the electrode blank has a predetermined diameter, and shaping the drawn electrode blank into a predetermined electrode configuration.

According to the present invention, there is also provided a method of manufacturing a resistance welding electrode for supplying a current to metal workpieces to weld the workpieces to each other, comprising the steps of shaping an electrode matrix as a cylinder having a diameter greater than the resistance welding electrode, defining a plurality of holes in the electrode matrix parallel to a direction in which a current flows therethrough such that the total cross-sectional area of the holes is in the range of 0.5 to 40% of the cross-sectional area of the electrode matrix after the resistance welding electrode is formed, inserting a plurality of rods of a material having an electric conductivity different from that of the electrode matrix respectively Into the holes thereby to form an electrode blank, drawing the electrode blank until the electrode blank has a predetermined diameter, and shaping the drawn electrode blank into a predetermined electrode configuration.

The electrode blank may be drawn to the predetermined diameter by extruding the electrode blank to a given diameter, and then heating, drawing, and annealing the electrode blank to a final diameter.

In the above methods, after the powder of a material having an electric conductivity different from that of the electrode matrix is filled in the holes, or the rods of a material having an electric conductivity different from that of the electrode matrix are inserted respectively into the holes, thereby forming an electrode blank, when the electrode blank is drawn until the electrode blank has a predetermined diameter, the filled powder or the inserted rods are also drawn into filamentary members of a given diameter. Therefore, it is not necessary to produce an electrode blank as thick as a final electrode and define thin holes in the electrode matrix, or to subsequently insert filamentary members of a material having an electric conductivity different from that of the electrode matrix into such thin holes, and it is not necessary to machine a material having an electric conductivity different from that of the electrode matrix into thin filamentary members. Consequently, the resistance welding electrode can easily be manufactured.

The rods may be produced either by pressing to shape a powder of the material having an electric conductivity different from that of the electrode matrix, or by pressing to shape a powder of the material having an electric conductivity different from that of the electrode matrix, and thereafter temporarily sintering the powder pressed to shape, or by pressing to melting a powder of the material having an electric conductivity different from that of the electrode matrix, and thereafter casting the melted powder.

Each of the methods may additionally include the steps of defining a coolant hole in an end of the electrode blank which has a predetermined length, and shaping the opposite end of the electrode blank into a predetermined configuration such as a spherical convex configuration.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A resistance welding electrode according to a first embodiment of the present invention will first be described below with reference to FIGS. 1 through 7.

Figure 1:
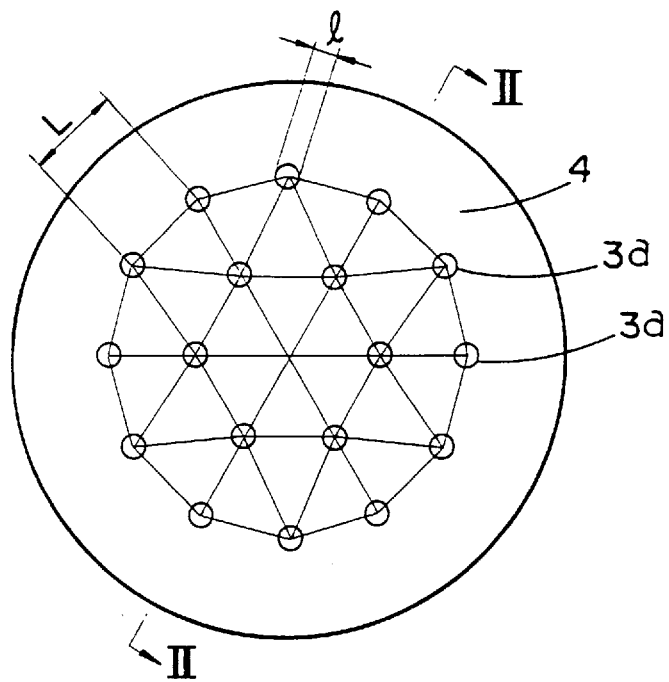
FIG. 1 is a plan view of a resistance welding electrode according to a first embodiment of the present invention.
Figure 2:
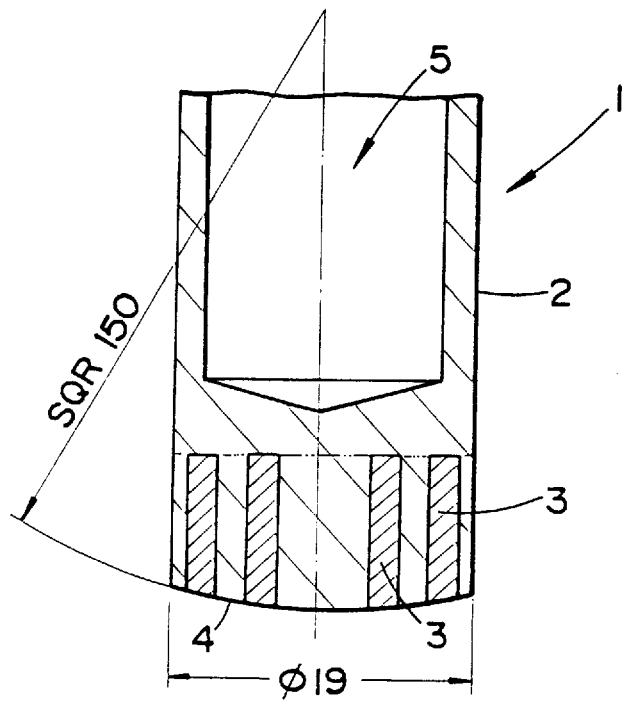
FIG. 2 is a cross-sectional view taken along line II—II of FIG. 1.

As shown in FIGS. 1 and 2, a resistance welding electrode 1 according to the first embodiment comprises an electrode body 2 as an electrode matrix made of a Cr—Cu alloy and having a diameter of 19 mm, and a plurality of filamentary members 3 embedded in the electrode body 2 parallel to the direction in which a current flows therethrough and having respective tip ends 3a exposed as lands on the surface of a tip end 4 of the electrode body 2, the filamentary members 3 being made of are having an electric conductivity different from that or the electrode matrix. The exposed tip ends 3a of the filamentary members 3 have a total area which is in the range of 0.5 to 40% of the entire area of the tip end 4 of the electrode body 2.

As shown in FIG. 1, the exposed tip ends 3a of the filamentary members 3 on the tip end 4 are joined by hypothetical straight lines which make up regular triangles each having sides of a length L, with no filamentary member located at the center of the tip end 4 of the electrode body 2. Adjacent ones of the filamentary members 3 are spaced at equal distances from each other.

As shown in FIG. 2, the tip end 4 of the electrode body 2 is of a spherical convex shape whose radius of curvature is 150. The electrode body 2 has a coolant hole 5 of a predetermined length defined therein which extends axially from an opposite end toward the tip end 4, but terminates short of the tip end 4.

Figure 3:
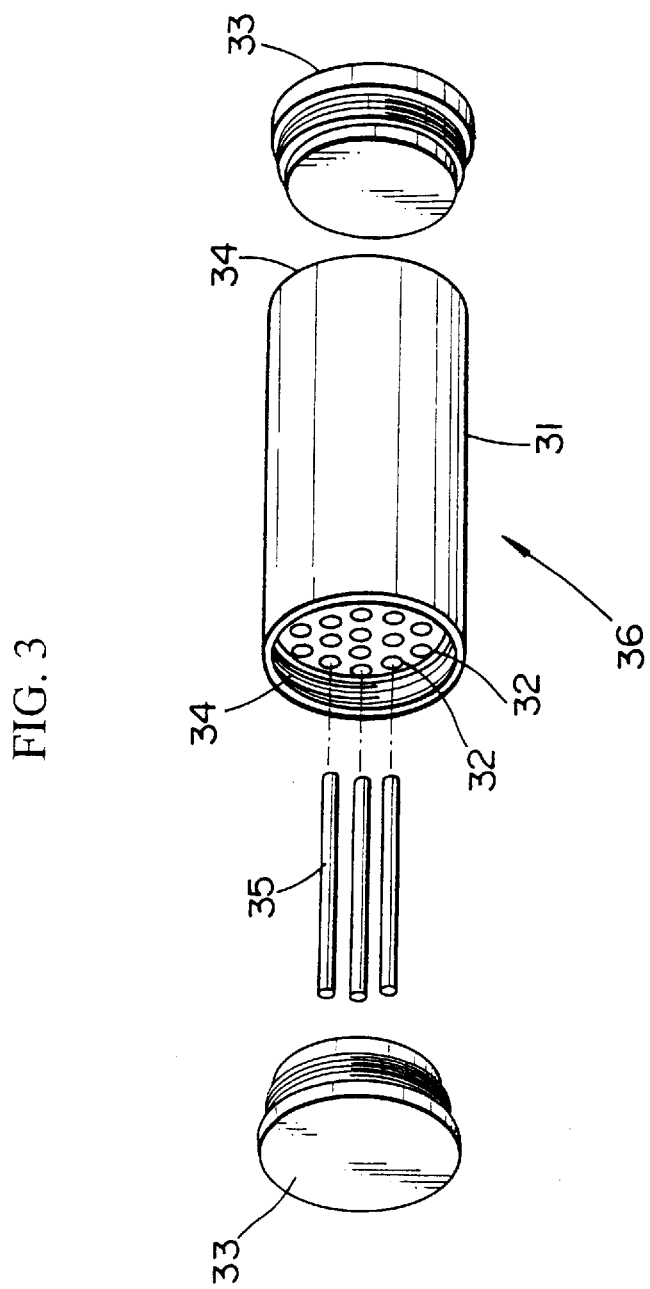
FIG. 3 is an exploded perspective view showing the manner in which the resistance welding electrode shown in FIGS. 1 and 2 is manufactured.

The resistance welding electrode 1 was manufactured as follows: As shown in FIG. 3, an electrode matrix 31 made of a Cr—Cu alloy was shaped as a cylinder having a diameter of 400 mm. Then, a plurality of parallel holes 32 were defined longitudinally in the electrode matrix 31, and opposite ends of the electrode matrix 31 were internally threaded at 34 for receiving respective caps 33.

Thereafter, a plurality or rods 35 produced by pressing a powder of Fe were inserted respectively into the holes 32, and then the opposite ends of the electrode matrix 31 were closed and sealed off by the caps 33, thereby producing a billet 36 having a length of 1000 mm to be processed by hot extrusion. Different sets of rods 35 having respective diameters of 10 mm, 20 mm, and 40 mm, were produced, and inserted into respective electrode matrixes 31, thus producing three billets 36. In the three billets 36, the holes 32 had diameters corresponding respectively to the diameters of the inserted rods 35. The total cross-sectional areas of the holes 32 in the three electrode matrixes 31 were 1.1%, 4.5%, and 18%, respectively, of the cross-sectional areas of the electrode matrixes 31.

The billets 36 were extruded at a temperature of about 1000° C. under a pressure ranging from 1500 to 3500 tons by a hot hydrostatic extrusion machine, producing extruded bodies each having a diameter of 40 mm. Then, the extruded bodies were heated, drawn, and annealed into electrode blanks (not shown) each having a diameter of 20 mm. At the same time that the extruded bodies were drawn, the rods 35 were drawn into filamentary members 3 having diameters l (see FIG. 1) of 0.5 mm, 1 mm, and 2 mm which were embedded in the electrode blanks of a diameter of 20 mm.

The electrode blanks of a diameter of 20 mm were then cut into a length of 80 mm, exposing the filamentary members 3 on their cut surfaces.

The tip ends 4 of the electrode blanks where the filamentary members 3 were exposed were machined into a spherical convex shape with a radius of curvature of 150, as shown in FIG. 2. coolant holes 5 having a diameter of 16 mm and a depth of 65 mm were formed in the respective electrode blanks from the opposite ends thereof, which were then machined into a final diameter of 19 mm. As a result, three resistance welding electrodes 1 as shown in FIGS. 1 and 2 were obtained. Because of the different diameters of the three sets of filamentary members 3, the exposed tip ends 3a of the filamentary members 3 had total areas which were 1.2%, 5.0%, and 20%, respectively, of the entire area of the tip end 4 of each of the resistance welding electrodes 1.

In the above embodiment, the rods 35 shown in FIG. 3 were produced by pressing the powder of a material having an electric conductivity different from that of the electrode matrix. However, the rods 35 may be produced by pressing and thereafter temporarily sintering the powder of such a material, or melting and thereafter casting the powder of such a material.

Figure 4:
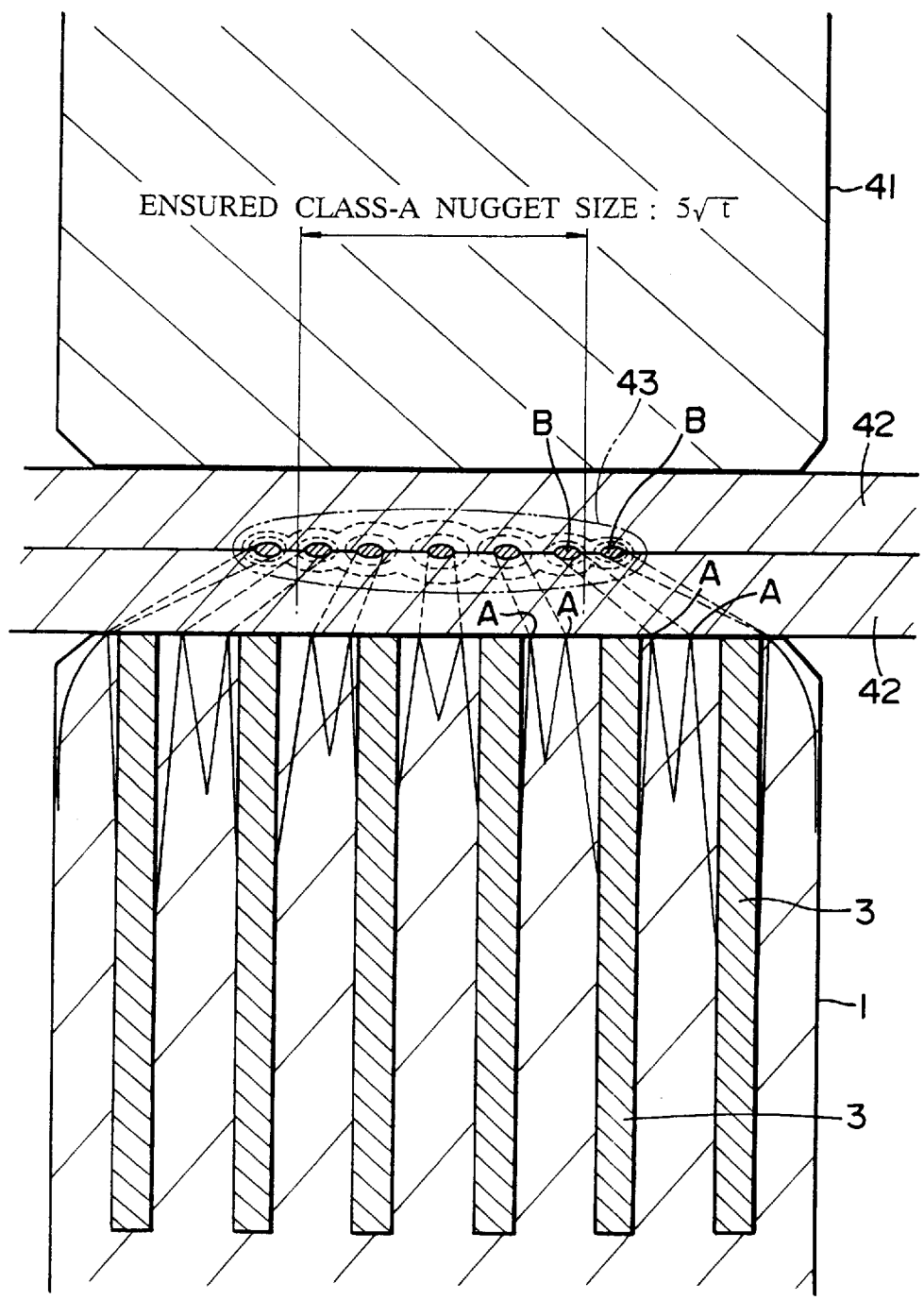
FIG. 4 is an enlarged cross-sectional view showing the manner metal plates are welded by the resistance welding electrode according to the first embodiment.

Then, as shown FIG. 4, plates 42 of an aluminum alloy (A5052, O material, thickness: 1 mm) were welded with a direct current by a cathode electrode comprising the resistance welding electrode 1 and an anode electrode comprising a conventional resistance welding electrode 41. The conventional resistance welding electrode 41 was made of a Cr—Cu alloy only, with no exposed material having a different electric conductivity on the tip end. In FIG. 4, the resistance welding electrode 1 is shown as having more filamentary members 3 than shown in FIG. 2 for illustrating a current density distribution.

As can be seen from a current density distribution curve shown in FIG. 4, many regions A of a high current density are developed in the boundaries between the electrode body 2 and the filamentary members 3 of the resistance welding electrode 1. Since the exposed ends of the filamentary members 3 are arranged on the surface of the tip end 4 of the resistance welding electrode 1 as shown in FIG. 1, the regions A are scattered around the filamentary members 3 that are exposed on the surface of the tip end 4 of the resistance welding electrode 1, and the current densities around the filamentary members 3 are equal to each other. As a result, as shown in FIG. 4, when a current is supplied to the resistance welding electrodes 1, 41 pressed against the aluminum-alloy plates 42, electrons are discharged from the high-current-density regions A scattered around the filamentary members 3, forming many fused spots B corresponding to the regions A in faying surfaces of the aluminum-alloy plates 42. As the welding cycle is repeated, the fused spots B are grown and joined to each other, thereby producing a single nugget 43 as indicated by the phantom lines in FIG. 4

Figure 5:
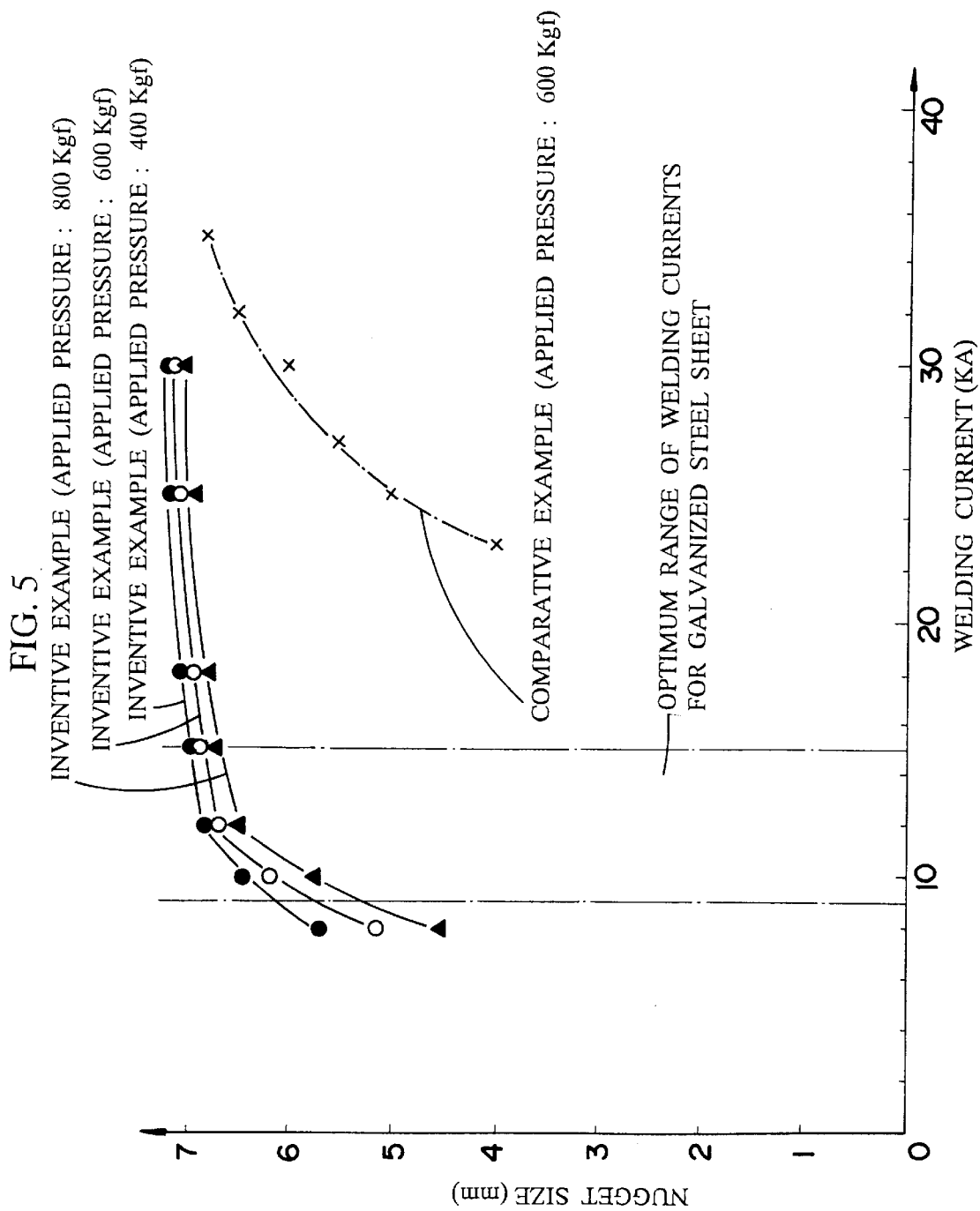
FIG. 5 is a graph showing the relationship between a welding current and a nugget size at the time metal plates are resistance-welded by the resistance welding electrode according to the first embodiment with a direct current that is supplied in 5 cycles.
Figure 6:
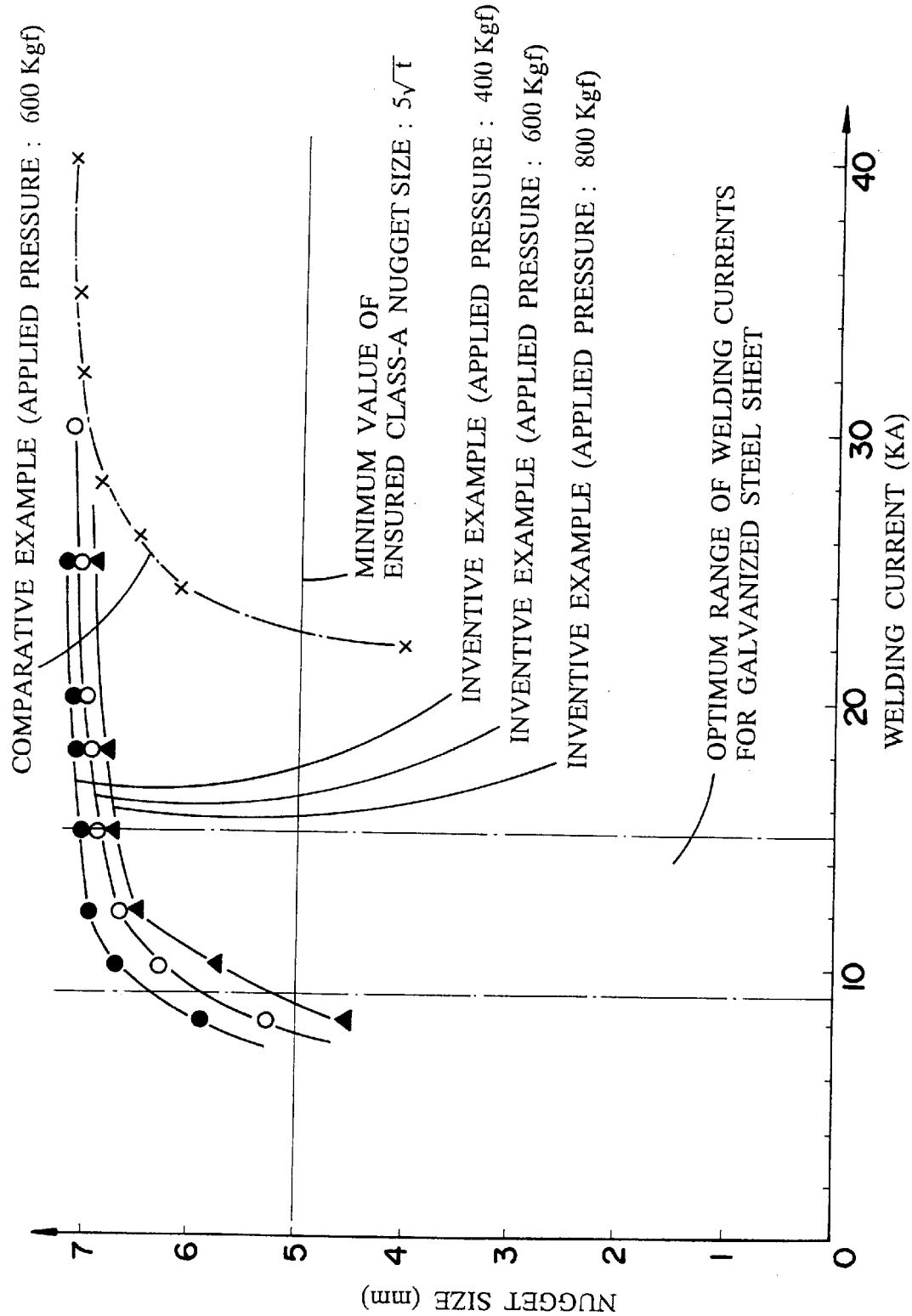
FIG. 6 is a graph showing the relationship between a welding current and a nugget size at the time metal plates are resistance-welded by the resistance welding electrode according to the first embodiment with a direct current that is supplied in 8 cycles.

The manufactured resistance welding electrodes 1 (with l =2 mm and L=6 mm in FIG. 1) were arranged as shown in FIG. 4, and the aluminum-alloy plates were resistance-welded by the resistance welding electrodes 1 with a direct current. FIG. 5 shows the relationship between a welding current and a nugget size at the time the current is supplied in 5 cycles in the welding process, and FIG. 6 shows the relationship between a welding current and a nugget size at the time the current is supplied in 8 cycles in the welding process. The resistance welding electrodes 1 were pressed against the aluminum-alloy plates under pressures of 400 kgf, 600 Kgf, and 800 Kgf, respectively, which are referred to as respective Inventive Examples in FIGS. 5 and 6. In Comparative Example shown in FIGS. 5 and 6, aluminum-alloy plates were resistance-welded with a direct current by anode and cathode electrodes which comprise conventional resistance welding electrodes 41 and were pressed against the metal plates under 600 Kgf.

It can be understood from FIGS. 5 and 6 that when the resistance welding electrode 1 is used as a cathode electrode and the conventional resistance welding electrode 41 is used as an anode electrode in resistance-welding the aluminum-alloy plates with a direct current, a nugget having an ensured class-A nugget size of $5t^{1/2}$ (t is the thickness of the aluminum-alloy plates) is produced with a lower current than when both anode and cathode electrodes comprise the conventional resistance welding electrodes 41 When the resistance welding electrode 1 is used as a cathode electrode and the conventional resistance welding electrode 41 is used as an anode electrode in resistance-welding the aluminum-alloy plates with a direct current, the aluminum-alloy plates can be welded with a welding current in the range of from 9 to 15 kA, which is an optimum range of welding currents for welding galvanized steel plates.

Figure 7:
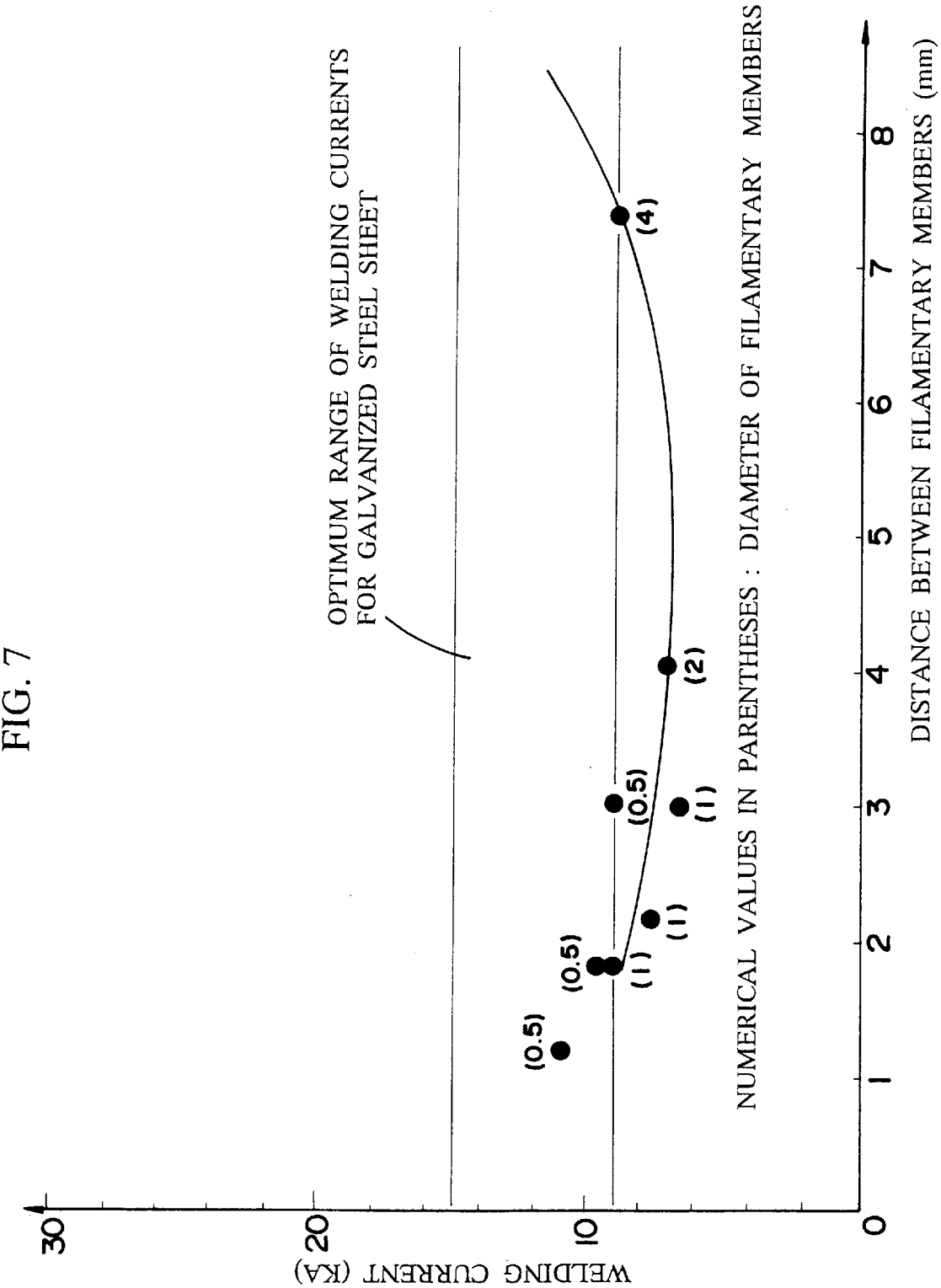
FIG. 7 is a graph showing the manner in which a welding current varies when the diameter of filamentary members shown in FIG. 1 and the distance between the filamentary members are varied at the time metal plates are resistance welded by the resistance welding electrode according to the first embodiment with a direct current.

FIG. 7 shows the manner in which the welding current varies when the diameter/of the filamentary members 3 and the distance L between the filamentary members 3 are varied at the time the aluminum-alloy plates are resistance-welded with a direct current by the resistance welding electrode 1 used as a cathode electrode and the conventional resistance welding electrode 41 used as an anode electrode as shown in FIG. 4. A study of FIG. 7 indicates that when the resistance welding electrode 1 is arranged as shown in FIG. 4 to resistance-weld the aluminum-alloy plates with a direct current, it can weld the metal plates with a welding current in the range of from 9 to 15 kA, which is an optimum range of welding currents for welding galvanized steel plates, by selecting the diameter l of the filamentary members 3 and the distance L between the filamentary members 3.

A resistance welding electrode according to a second embodiment of the present invention will be described below with reference to FIGS. 8 through 11.

According to the second embodiment, a resistance welding electrode having an electrode body as an electrode matrix made of a Cr—Cu alloy and a plurality of filamentary members 3 made of Fe or Mo embedded in the electrode body was manufactured as with the first embodiment. The resistance welding electrode had a diameter of 19 mm. The filamentary members 3 each had a diameter of 2 mm, and were arranged in any of the patterns shown in FIGS. 8 through 11.

Figure 8:
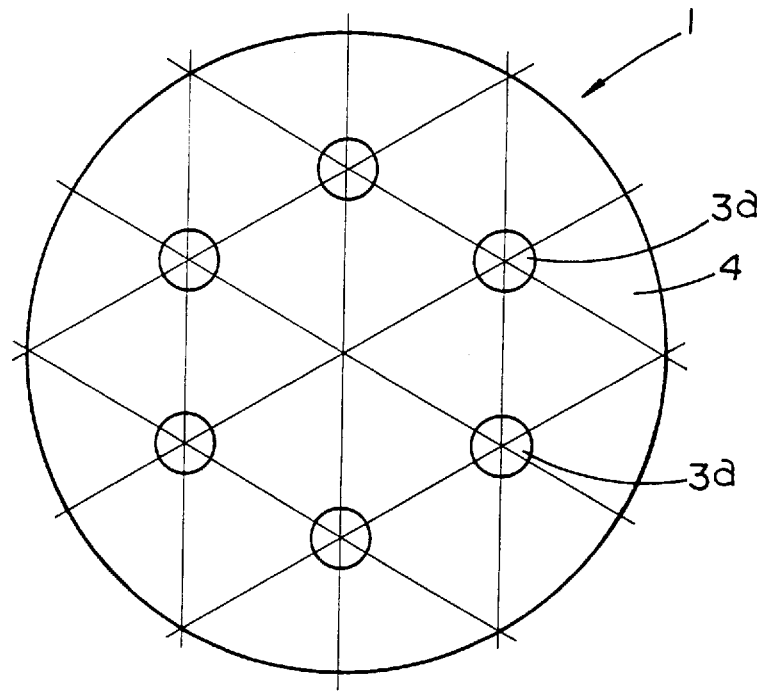
FIG. 8 is a plan view showing an arrangement of filamentary members in a resistance welding electrode according to a second embodiment of the present invention.

In FIG. 8, the exposed tip ends 3a of the filamentary members 3 are joined by hypothetical straight lines which make up regular triangles each having sides of a length of 6 mm. The exposed tip ends 3a are positioned on the tip end 4 at respective vertexes of the regular triangles, with no filamentary member located at the center of the tip end 4 of the electrode body 2. The number of the filamentary members 3 is 6. The exposed tip ends 3a of the filamentary members 3 have a total area which is 6.6% of the entire area of the tip end 4 of the electrode body 2.

Figure 9:
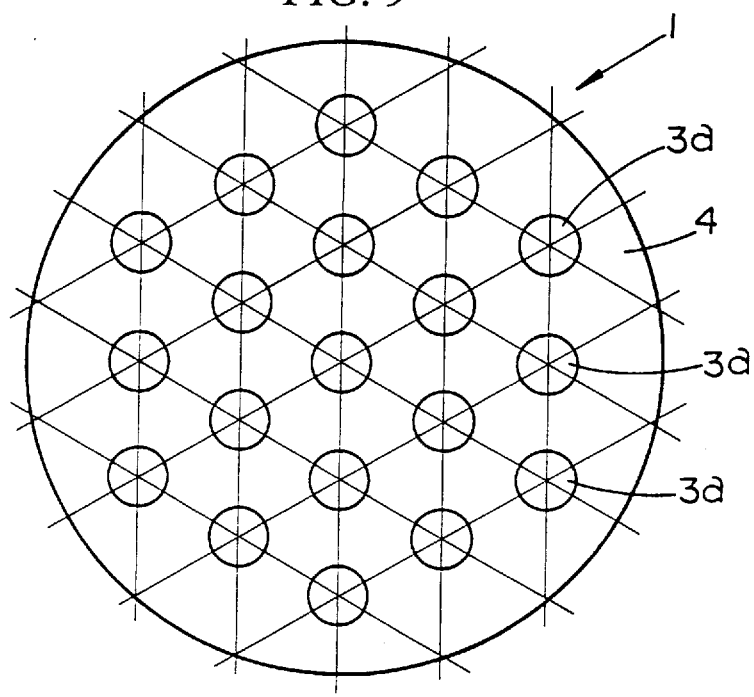
FIG. 9 is a plan view showing another arrangement of filamentary members in the resistance welding electrode according to the second embodiment.

In FIG. 9, the exposed tip ends 3a of the filamentary members 3 are positioned on the tip end 4 at respective vertexes of regular triangles formed by hypothetical straight lines joining the exposed tip ends 3a and each having sides of a length of 4 mm. The number of the filamentary members 3 is 19. The exposed tip ends 3a of the filamentary members 3 have a total area which is 21.1% of the entire area of the tip end 4 of the electrode body 2.

Figure 10:
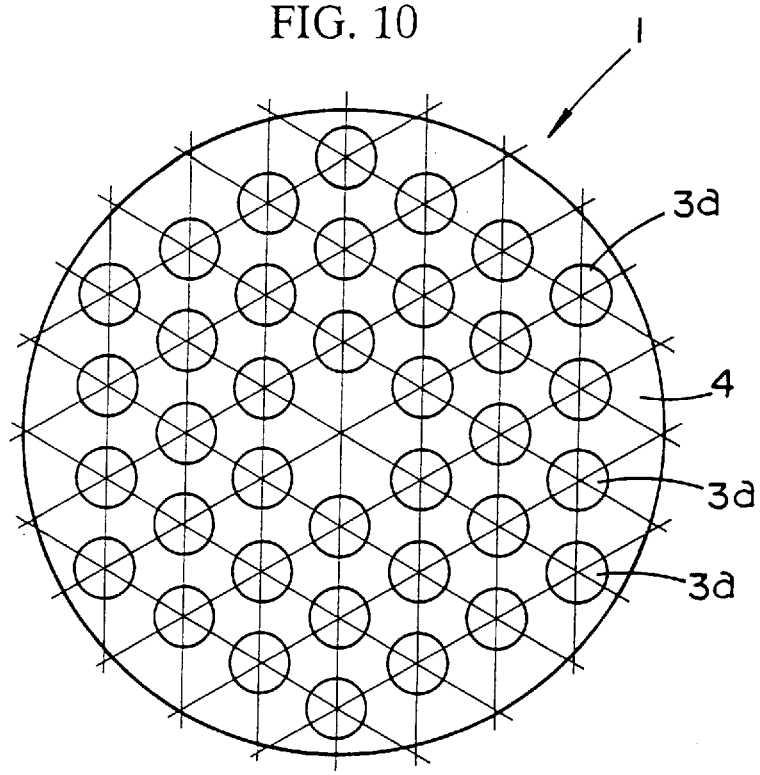
FIG. 10 is a plan view showing still another arrangement of filamentary members in the resistance welding electrode according to the second embodiment.

In FIG. 10, the exposed tip ends 3a of the filamentary members 3 are positioned on the tip end 4 at respective vertexes of regular triangles formed by hypothetical straight lines joining the exposed tip ends 3a and each having sides of a length of 3 mm, with no filamentary member located at the center or the tip end 4 of the electrode body 2. The number or the filamentary members 3 is 36. The exposed tip ends 3a of the filamentary members 3 have a total area which is 39.9% of the entire area of the tip end 4 of the electrode body 2.

Figure 11:
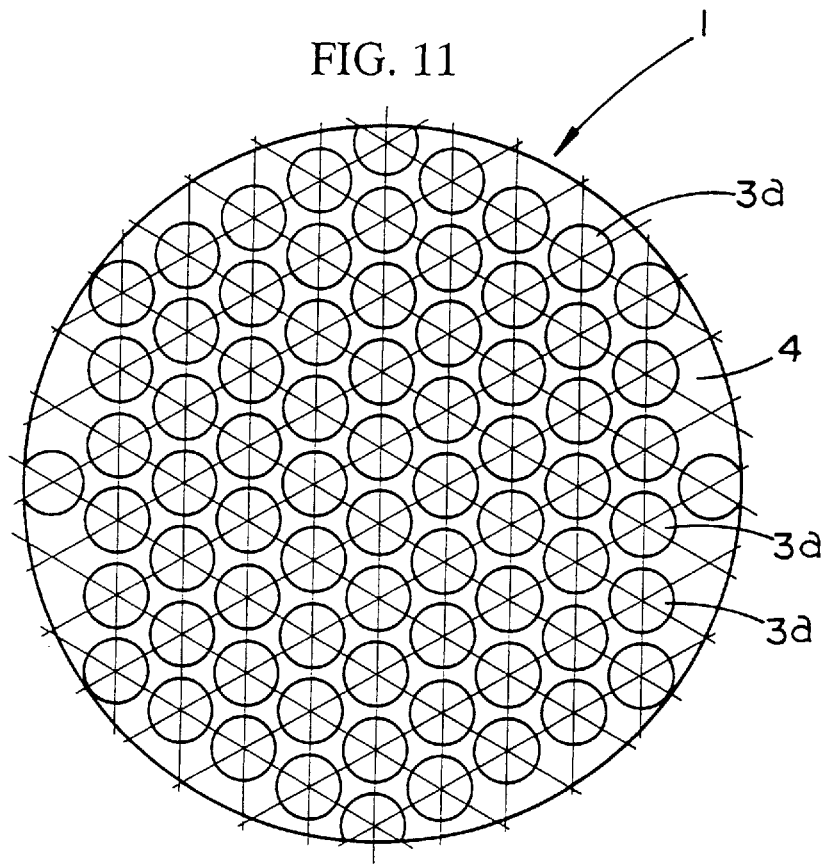
FIG. 11 is a plan view showing a still further arrangement of filamentary members in the resistance welding electrode according to the second embodiment.

In FIG. 11, the exposed tip ends 3a of the filamentary members 3 are positioned on the tip end 4 at respective vertexes of regular triangles formed by hypothetical straight lines joining the exposed tip ends 3a and each having sides of a length of 2.2 mm. The number of the filamentary members 3 is 70. There are four filamentary members 3 positioned across the outer circumferential edge of the electrode body 2, and these four filamentary members 3 are considered collectively as one filamentary member 3. The exposed tip ends 3a of the filamentary members 3 have a total area which is 77.7% of the entire area of the tip end 4 of the electrode body 2.

Sheets of an aluminum alloy (AP5052, thickness: 2 mm) were welded with a direct current by a cathode electrode comprising the resistance welding electrode 1 with the filamentary members 3 arranged as shown in each of FIGS. 8 through 11 and an anode electrode comprising a conventional resistance welding electrode 41, as shown in FIG. 4. The conventional resistance welding electrode 41 was made of a Cr—Cu alloy only, with no exposed material having a different electric conductivity on the tip end.

welding currents consumed and welded results produced when the aluminum-alloy plates were resistance-welded using the resistance welding electrodes 1 as shown in FIGS. 8 through 11 are shown in Table 1 below. Table 1 also includes, for comparison, a welding current consumed and welded results produced when the aluminum-alloy plates were resistance-welded using the conventional resistance welding electrodes 41 as anode and cathode electrodes in the same manner as described above.

TABLE 1

| Distance between filamentary members (mm) | Number of filamentary members | Area ratio (%) | Welding current (kA) | Effective welding count | Adhesion count/ Effective welding count |
|---|---|---|---|---|---|
| 6 | 6 | 6.6 | 10 | 700 | 0/700 |
| 4 | 19 | 21.1 | 8 | 900 | 0/900 |
| 3 | 36 | 39.9 | 11 | 500 | 15/500 |
| 2.2 | 70 | 77.7 | 15 | 50 | 49/50 |
| Conventional Cr-Cu electrode | | | 34 | 200 | 120/200 |

In Table 1 above, the area ratio represents the ration of the sum of the areas of the exposed tip ends 3a to the entire area of the tip end 4, the welding current represents a minimum current which satisfies the class-A welding strength prescribed by JIS (Japanese Industrial Standards), the effective welding count represents the number of times that the resistance welding electrode can be used to successively weld workpieces while satisfying the class-A welding strength prescribed by JIS, and the adhesion count represents the number of times that the resistance welding electrode and the aluminum-alloy plate are fused to each other, out of the welding count.

It can be seen from Table 1 that the welding current lower than with the conventional resistance welding electrode and the resistance welding electrode and the aluminum-alloy plate are less likely to adhere to each other if the sum of the areas of the exposed tip ends 3a is 40% of or less than the area of the tip end 4, and that if the sum of the areas of the exposed tip ends 3a exceeds 40% of the area of the tip end 4, then the resistance welding electrode and the aluminum-alloy plate adhere to each other more frequently.

The reason for the more frequent adhesion between the resistance welding electrode and the aluminum-alloy plate appears to be that as the number of filamentary members 3 used increases, the effect of heat stored by the resistance welding electrode becomes greater than the effect of the current dispersed by the filamentary members 3, and the resistance welding electrode becomes less effective even if it is cooled by cooling water supplied to the hole 5.

A resistance welding electrode according to a third embodiment of the present invention will be described below.

According to the third embodiment, a resistance welding electrode having an electrode body as an electrode matrix made of a Cr—Cu alloy and a plurality of filamentary members 3 made of silicon nitride, kaolinite, alumina, a non-metallic inorganic material, an intermetallic compound, or a metal and embedded in the electrode body was manufactured as with the first embodiment. The non-metallic inorganic material was TiC or $TiB_2$, and the intermetallic compound was TiAl or $Ni_3Al$. The metal was Fe, Ni, Cr. Co, V, Mo, Zr, Ti, or W. Ag was used as the metal having a higher electric conductivity than that of the Cr—Cu alloy.

Figure 12:
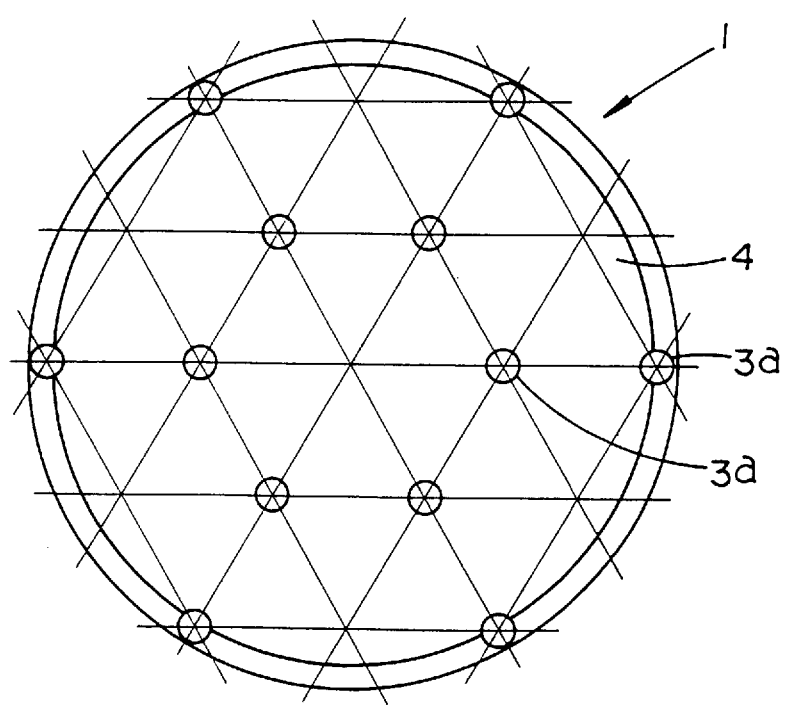
FIG. 12 Is a plan view showing an arrangement of filamentary members in a resistance welding electrode according to a third embodiment of the present invention.

In the third embodiment, the exposed tip ends 3a of the filamentary members 3 are arranged on the tip end 4 as shown in FIG. 12. The filamentary members 3 are made available in different sets according to the third embodiment, and the filamentary members 3 of different sets have diameters of 4, 3, 2, 1, 0.5 mm, respectively. The sums of the areas of the exposed tip ends 3a of the filamentary members 3 of different sets are 53%, 30%, 13%, 3.8%, and 0.8%, respectively, of the entire area of the tip end 4 of the resistance welding electrode 1.

As shown in FIG. 12, the exposed tip ends 3a of the filamentary members 3 are positioned on the tip end 4 at respective vertexes of the regular triangles, with no filamentary member located at the center of the tip end 4 of the electrode body 2. Adjacent filamentary member 3 are spaced at equal distances from each other, so that the exposed tip ends 3a of the filamentary members 3 are surrounded by equal areas an the tip end 4. Since the current slowing through the resistance welding electrode 1 is considered to be greater in an outer circumferential region thereof than in an inner circumferential region thereof, the resistance welding electrode 1 is designed to produce a first fused spot in metal plates with a current flowing in the outer circumferential region, for thereby directing electrons toward the center of the fused spot, in order to prevent a nugget (fused spots) from being deformed by the currents flowing in the outer and inner circumferential regions.

The maximum current in the high-current-density regions A shown in FIG. 4 varies by varying the areas around the exposed tip ends 3a and the diameter of the filamentary members 3. In this embodiment, the maximum current in the high-current-density regions A is made substantially constant by varying the diameter of the filamentary members 3 as described above and the areas around the exposed tip ends 3a.

Then, as shown FIG. 4, plates 42 of an aluminum alloy (A5052, O material, thickness; 2 mm) were welded with a direct current by a cathode electrode comprising the resistance welding electrode 1 according to the third embodiment and an anode electrode comprising a conventional resistance welding electrode 41. The conventional resistance welding electrode 41 was made of a Cr—Cu alloy only, with no exposed material having a different electric conductivity on the tip end.

Figure 13:
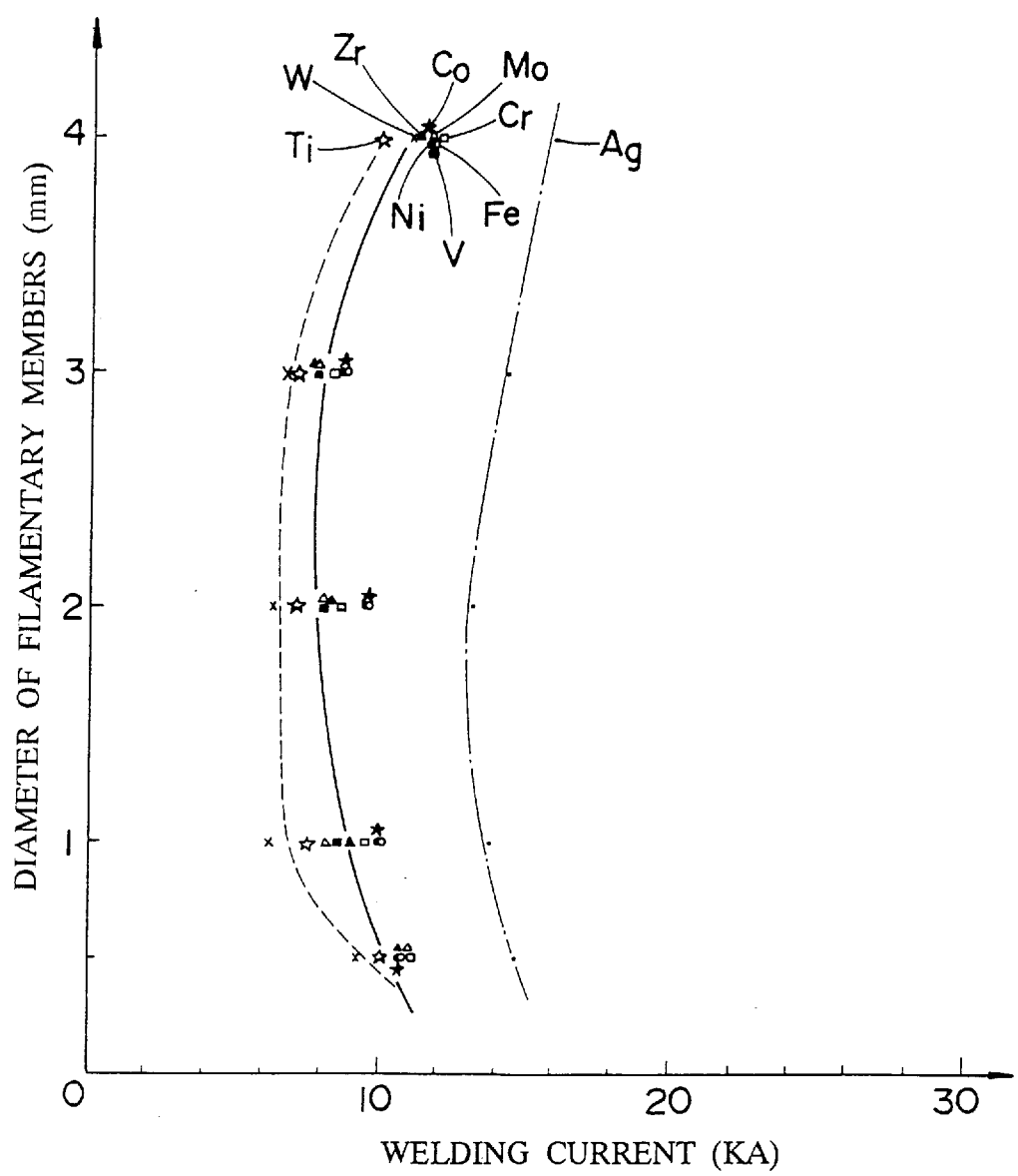
FIG. 13 is a graph showing the relationship between a welding current and the diameter of filamentary members which are made of metal at the time metal plates are resistance-welded by the resistance welding electrode according to the third embodiment with a direct current.

Welding currents capable of generating a nugget with a nugget size of 6.5 mm or more and producing a tensile shear strength of 700 kgf or more when the filamentary members 3 are made or metal and the resistance welding electrode is pressed against the aluminum-alloy plates under a pressure of 400 kgf, with respect to different metals and diameters of the filamentary members 3, are shown in Table 2 below. The results given Table 2 are shown in FIG. 13.

Figure 14:
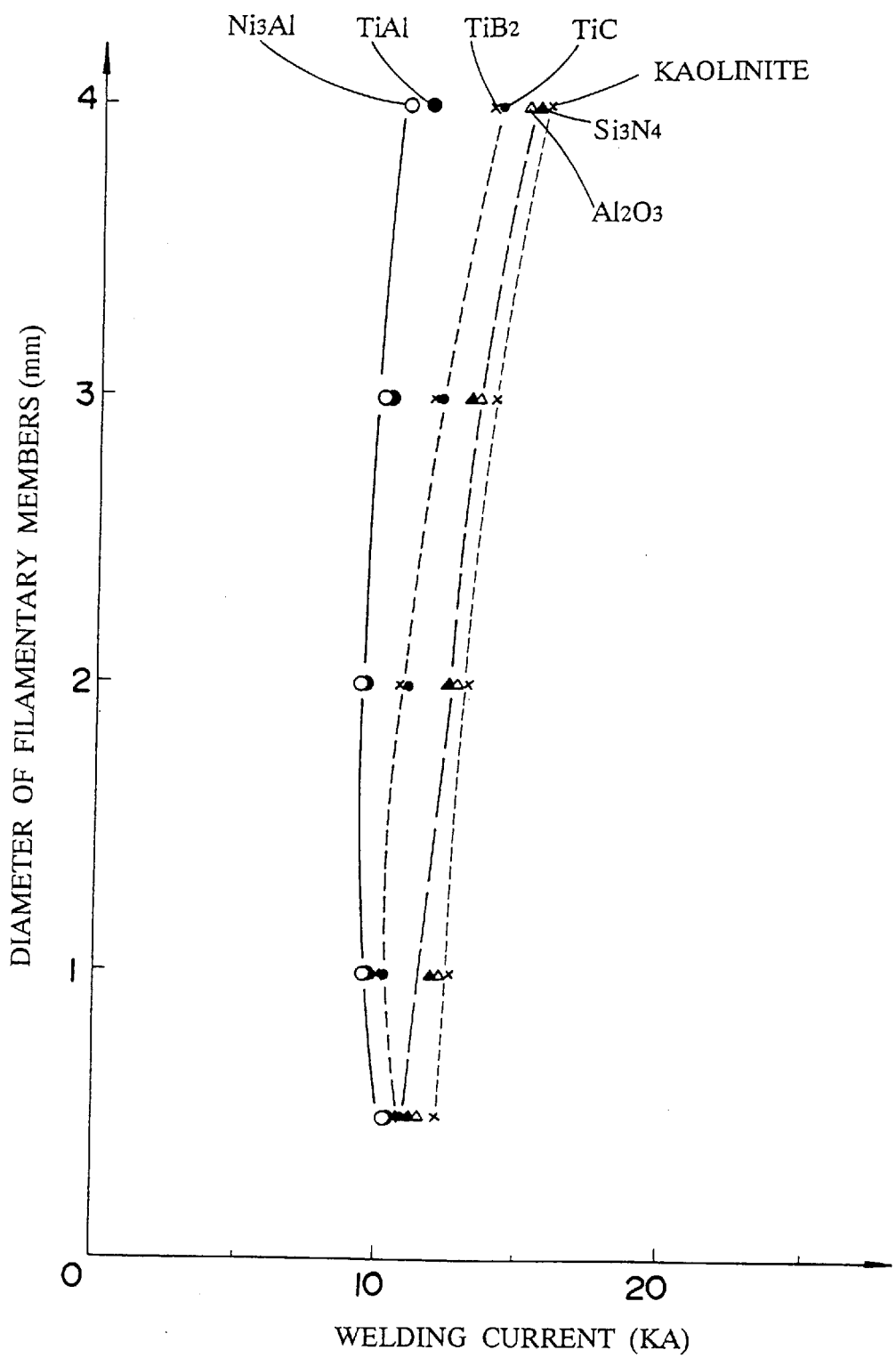
FIG. 14 is a graph showing the relationship between a welding current and the diameter of filamentary members which are made of silicon nitride, kaolinite, alumina, a non-metallic inorganic material, or an intermetallic compound at the time metal plates are resistance-welded by the resistance welding electrode according to the third embodiment with a direct current.

FIG. 14 shows the relationship between the diameter of the filamentary members 3 and welding current, which are capable of generating a nugget with nugget size of 6.5 mm or more and producing a tensile shear strength of 700 kgf or more when the filamentary members 3 are made of silicon nitride, kaolinite, alumina, a non-metallic inorganic material of TiC or $TiB_2$, or an intermetallic compound TiAl or $Ni_3Al$, and the resistance welding electrode is pressed against aluminum-alloy plates under a pressure of 400 kgf.

For comparison, the aluminum-alloy plates were also resistance-welded under the same conditions as referred to above using conventional resistance welding electrodes as anode and cathode electrodes, and the welding current consumed was in the range of from 26 to 28 kA.

TABLE 2

|  | Diameter of filamentary members (mm) | | | | |
| --- | --- | --- | --- | --- | --- |
| Filamentary members | 0.5 (kA) | 1 (kA) | 2 (kA) | 3 (kA) | 4 (kA) |
| Ti | 10.1 | 7.5 | 7.2 | 7.1 | 10.0 |
| W  | 9.2  | 6.2  | 6.3 | 6.8 | 11.0 |
| Fe | 10.8 | 10.01 | 9.6 | 8.8 | 11.5 |
| Ni | 10.6 | 10.0 | 9.6 | 8.7 | 11.4 |
| Cr | 11.1 | 9.5  | 8.7 | 8.3 | 12.0 |
| Co | 10.7 | 10.0 | 9.6 | 8.8 | 11.5 |
| V  | 10.7 | 8.5  | 8.0 | 7.8 | 11.5 |
| Mo | 10.8 | 8.1  | 8.0 | 7.9 | 11.5 |
| Zr | 10.7 | 9.0  | 8.1 | 7.8 | 11.4 |
| Ag | 14.7 | 13.8 | 13.2 | 14.4 | 15.9 |

As can clearly be seen from Table 2 and FIG. 13, when the aluminum-alloy plates are resistance-welded with a direct current by the resistance welding electrode of the present embodiment used as a cathode electrode with the filamentary members 3 of metal and the conventional resistance welding electrode used as an anode electrode, the welding current consumed is about 10 kA, which is much smaller than the welding current consumed by the conventional resistance welding electrodes used as anode and cathode electrodes. When the filamentary members 3 are made of Ti and W, the welding currents are particularly low, and when the filamentary members 3 are made of Fe, Ni, Co, and Cr, the welding currents are substantially the same as each other.

If the filamentary members 3 are made of Ag which has a higher electric conductivity than the Cr—Cu alloy of the electrode matrix and are arranged in the same manner as those of a metal of low electric conductivity, then the welding direct current consumed when aluminum-alloy plates are resistance-welded by the resistance welding electrode of the present embodiment used as a cathode electrode and the conventional resistance welding electrode used as an anode electrode is about 1.3 times the welding direct current which is consumed when aluminum-alloy plates are resistance-welded by resistance welding electrode with filamentary members 3 made of a metal of low electric conductivity. However, a welding current which is substantially the same as the welding current consumed by the resistance welding electrode with filamentary members 3 made of a metal of low electric conductivity is consumed by increasing the number of filamentary members 3 to increase the ratio of the total areas of the exposed tip ends 3a thereof to the entire area of the tip end 4 up to 40%.

As can be understood from FIG. 14, when aluminum-alloy plates are resistance-welded with a direct current using the resistance welding electrode of the present embodiment with the filamentary members 3 made of silicon nitride, kaolinite, alumina, a non-metallic inorganic material of TiC or $TiB_2$, or an intermetallic compound TiAl or $Ni_3Al$, the welding current consumed is higher than it is when a resistance welding electrode with filamentary members 3 made of a metal having a higher electric conductivity than these materials. However, the welding current consumed is reduced to one-half or less as compared with that consumed when the conventional resistance welding electrodes are used as anode and cathode electrodes, allowing the aluminum-alloy plates to be welded under the same conditions as those for galvanized steel plates.

In this embodiment, weak adhesion took place in the resistance welding with a direct current if the filamentary members 3 were made of Ti or W. If the filamentary members 3 were made of Fe, Ni, Co, or Cr,. no adhesion was caused when the filamentary members have a diameter of 2 mm or less, but slight adhesion occurred when they have a larger diameter of 4 mm. Such slight adhesion appears to result from the fact that the ratio of the total area of the exposed tip ends 3a to the area of the tip end 4 reaches 53% in excess of 40%.

If the filamentary members 3 are made of silicon nitride, kaolinite, alumina, a non-metallic inorganic material of TiC or $TiB_2$, or an intermetallic compound TiAl or $Ni_3Al$, adhesion is brought about even when the filamentary members 3 have a diameter of 0.5 mm. Since such adhesion is considered to be caused by the resistive heating of areas near the filamentary members 3 upon passage of the current therethrough, the diameter of the filamentary members 3 may be further reduced to reduce the areas around the exposed tip ends 3a thereof to reduce the adhesion.

In this embodiment, Ag is employed as a metal having a higher electric conductivity than the Cr—Cu alloy of the electrode matrix. However, Cu or sintered Cr—Cu alloy may be employed as such a metal.

A resistance welding electrode according to a fourth embodiment of the present invention will be described below.

According to the fourth embodiment, a resistance welding electrode having an electrode body as an electrode matrix made of a Cr—Cu alloy and a plurality of filamentary members 3 made of steel (SCM420) embedded in the electrode body was manufactured as with the first embodiment. Sheets of an aluminum alloy (A5182, thickness: 2.5 mm) were welded with a direct current by a cathode electrode comprising the resistance welding electrode of this embodiment and an anode electrode comprising a conventional resistance welding electrode. The same plates of an aluminum alloy were also welded with a direct current by conventional resistance welding electrodes used as cathode and anode electrodes. As a result of these resistance welding processes, ranges of currents and applied pressures optimum for resistance welding were compared.

Figure 15:
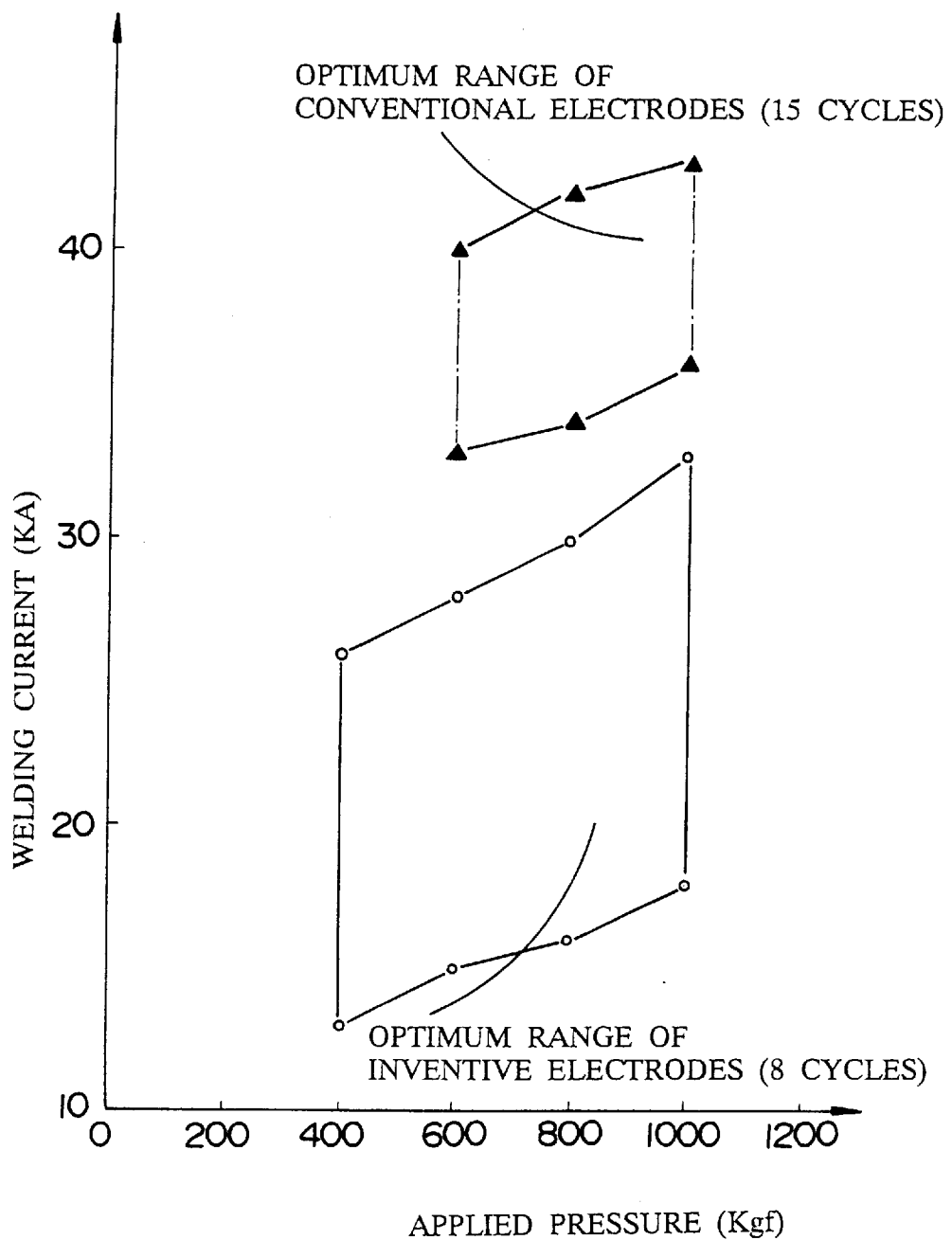
FIG. 15 is a graph showing an optimum range of welding conditions at the time metal plates are resistance welded by a resistance welding electrode according to a fourth embodiment of the present invention with a direct current.

With the resistance welding electrode according to the second embodiment, the diameter 1 of each of the filamentary members 3 is 2 mm, and the total area of the exposed tip ends 3a of the filamentary members 3 is 20% of the area of the electrode matrix in the tip end 4 of the resistance welding electrode 1. The conventional resistance welding electrode was made of a Cr—Cu alloy only, with no exposed material having a different electric conductivity on the tip end. FIG. 15 shows the ranges of currents and applied pressures optimum for resistance welding.

It can be seen from FIG. 15 that the aluminum-alloy plates can be welded by the resistance welding electrode according to the fourth embodiment with a welding direct current in the range of 13~32 kA in 8 cycles, and hence can be welded with a lower current in fewer cycles than by the conventional resistance welding electrodes used as cathode and anode electrodes because the aluminum-alloy plates can be welded by the conventional resistance welding electrodes with a welding direct current in the range of 33~42 kA in 15 cycles. Since the range of adequate resistance welding conditions is increased by the resistance welding electrode according to the fourth embodiment, the aluminum-alloy plates can be welded by the resistance welding electrode with a welding current in the range of from 9 to 15 kA, which is an optimum range of welding currents for welding galvanized steel plates. Therefore, aluminum-alloy plates can be welded on the same production line as galvanized steel plates.

A fifth embodiment of the present invention will be described below.

The fifth embodiment is concerned with another process of manufacturing a resistance welding electrode. According to the fifth embodiment, the resistance welding electrode 1 shown In FIGS. 1 and 2 as manufactured as follows: As shown in FIG. 3, an electrode matrix 31 made of a Cr—Cu alloy was shaped as a cylinder having a diameter of 400 mm. Then, a plurality of parallel holes 32 were defined longitudinally in the electrode matrix 31, and opposite ends of the electrode matrix 31 were internally threaded at 34 for receiving respective caps 33.

Thereafter, a powder of a material having a different electric conductivity from that of the electrode matrix 31 was filled in the holes 32, and then the opposite ends of the electrode matrix 31 were closed and sealed off by the caps 33, thereby producing a billet 36 having a length of 1000 mm to be processed by hot extrusion. Five billets 36 having holes 32 of different diameters for producing filamentary members 3 of the powder having diameters of 4, 3, 2, 1, and 0.5 mm were produced.

The billets 36 were extruded at a temperature of about 1000° C. under a pressure of 1500 tons by a hot hydrostatic extrusion machine, producing extruded bodies each having a diameter-of 40 mm. Then, the extruded bodies were heated, drawn, and annealed into electrode blanks (not shown) each having a diameter of 20 mm. At the same time that the extruded bodies were drawn, filamentary members 3 having diameters l (see FIG. 1) of 4, 3, 2, 1, and 0.5 mm were produced in the electrode blanks of a diameter of 20 mm.

The electrode blanks of a diameter of 20 mm were then cut into a length of 80 mm, exposing the filamentary members 3 on their cut surfaces.

The tip ends 4 of the electrode blanks where the filamentary members 3 were exposed were machined into a spherical convex shape with a radius of curvature of 150, as shown in FIG. 2. Coolant holes 5 having a diameter of 16 mm and a depth of 65 mm were formed in the respective electrode blanks from the opposite ends thereof, which were then machined into a final diameter of 19 mm. As a result, five resistance welding electrodes 1 as shown in FIGS. 1 and 2 were obtained. Because of the different diameters of the five sets of filamentary members 3, the exposed tip ends 3a of the filamentary members 3 had total areas which were 53%, 30%, 13%, 3.8%, and 0.8%, respectively, of the entire area of the tip end 4 of each of the resistance welding electrodes 1.

In the above embodiment, the powder included Fe power of 100 mesh or less, Cr powder of 100 mesh or less, V powder of 100 mesh or less, and Ni$_3$Al powder of 100 mesh or less. Since the powder tends to increase the resistance of the electrode matrix 31 when dispersed in the electrode matrix 31 during the hot extrusion, the powder should preferably be of relatively coarse particles. If powders of W and Zr were employed in the manufacturing process according to this embodiment, then they would be liable to be scattered in the electrode matrix 31 at a temperature in the vicinity of 1000° C.

In the manufacturing process according to this embodiment, because the extrusion pressure is high, there is hardly any possibility for interstices to remain between the particles of the powder. If particles were separate from each other, however, the resultant resistance welding electrode would be low in wear resistance. To prevent the resistance welding electrode 1 and workpieces to be welded from adhering to each other, it is preferable In some cases that the bonding of powder particles be weak in the filamentary members 3 formed from the powder. In this embodiment, therefore, in addition to those resistance welding electrodes in which the filamentary members 3 were formed solely from the powder, there were manufactured resistance welding electrodes in which 40 weight % of a powder of electrolytic copper of 325 mesh or less were added to each of the powders in order to adjust the bonding condition of the powder particles. Then, as shown FIG. 4, plates 42 of an aluminum alloy (A5052, O material, thickness: 1 mm) were welded with a direct current by a cathode electrode comprising the resistance welding electrode 1 and an anode electrode comprising a conventional resistance welding electrode 41. The conventional resistance welding electrode 41 was made of a Cr—Cu alloy only, with no exposed material having a different electric conductivity on the tip end.

Table 3 below shows welding currents capable of generating a nugget with a nugget size of 6.5 mm or more under an applied pressure of 400 kgf and producing a tensile shear strength of 700 kgf or more, with respect to the respective powders and the diameters of the filamentary members 3 formed from the powders.

TABLE 3

| Composition of powder | Diameter of filamentary members (mm) | | | | |
|---|---|---|---|---|---|
| | 0.5 (kA) | 1 (kA) | 2 (kA) | 3 (kA) | 4 (kA) |
| Fe only | 11.2 | 10.6 | 10.2 | 9.7 | 12.1 |
| (Copper powder added) | 11.4 | 10.8 | 10.3 | 9.8 | 12.3 |
| Cr only | 11.4 | 10.2 | 9.2 | 8.6 | 12.5 |
| (Copper powder added) | 11.5 | 10.4 | 9.5 | 9.1 | 12.8 |
| V only | 11.3 | 9.8 | 9.4 | 9.1 | 11.8 |
| (Copper powder added) | 11.4 | 9.9 | 9.6 | 9.4 | 12.1 |
| Ni$_3$Al only | 11.3 | 10.5 | 10.1 | 9.8 | 12.3 |
| (Copper powder added) | 11.4 | 10.7 | 10.4 | 10.1 | 12.5 |

As can be seen from Table 3, the aluminum-alloy plates can be welded with a welding current of about 10 kA by the resistance welding electrodes which have powders of materials having different electric conductivities than those of the electrode matrix 31 and filled in the holes 32, as with the resistance welding electrodes which have rods 35 inserted in the holes 32.

A first comparative example with respect to the above embodiments in which the aluminum-alloy plates are welded with a direct current by a cathode electrode comprising the resistance welding electrode 1 according to the present invention and an anode electrode comprising the conventional resistance welding electrode 41 will be described below.

In the comparative example, the resistance welding electrode 1 according to the present invention was used as an anode electrode and the conventional resistance welding electrode 41 as a cathode electrode, and plates of an aluminum alloy (A5182, thickness: 2 mm) were resistance-welded with a direct current under a pressure of 600 kgf by the resistance welding electrodes, and also by conventional resistance welding electrodes used as anode and cathode electrodes. Welding currents and durability counts, which represent the number of times that the resistance welding electrodes can be used before they are not usable due to fusion or damage, were measured for comparison.

In the comparative example, the resistance welding electrode 1 according to the present invention, which served as the anode electrode, had four or six filamentary members 3 shown in FIG. 1 in the electrode matrix, each of the filamentary members 3 having a diameter of 2 mm. The total area of the exposed tip ends 3a of the filamentary members 3 is 4.4% or 6.6% of the area of the tip end 4 depending on the number of filamentary members 3 used. The electrode-matrix of the resistance welding electrode 1 according to the present invention was made of a Cr—Cu alloy, and the filamentary members 3 were made of silicon nitride, kaolinite, an intermetallic compound, or a metal. The resistance welding electrode 1 according to the present invention was manufactured in the same manner as the resistance welding electrode 1 according to the first embodiment. The intermetallic compound was TiAl, and the metal was Fe, Ni, Ti, or W.

The resistance welding electrode, which served as the cathode electrode, was the conventional resistance welding electrode described above, and made of a Cr—Cu alloy only, with no exposed material having a different electric conductivity on the tip end.

Table 4 shows the measured results of the first comparative example. In Table 4, the welding currents and the durability counts are given as ratios to wherein a ratio of 1 was defined as when the aluminum-alloy plates were resistance-welded by the conventional resistance welding electrodes used as anode and cathode electrodes.

TABLE 4

| Material of filamentary members | Number of filamentary members | Welding current ratio | Durability count ratio |
|---|---|---|---|
| Fe | 6 | 0.99 ~ 1 | 10 |
| | 4 | 0.98 ~ 1 | 12 |
| Ni | 6 | 0.99 ~ 1 | 14 |
| | 4 | 0.97 ~ 1 | 18 |
| Ti | 6 | 1 ~ 1.03 | 3 |
| | 4 | 1 ~ 1.05 | 2 |

TABLE 4-continued

| Material of filamentary members | Number of filamentary members | Welding current ratio | Durability count ratio |
|---|---|---|---|
| W | 6 | 0.97 ~ 1 | 22 |
|  | 4 | 0.95 ~ 1 | 25 |
| TiAl | 6 | 1 ~ 1.02 | 4 |
|  | 4 | 1 ~ 1.05 | 2 |
| Kaolinite | 6 | 0.98 ~ 1 | 40 |
|  | 4 | 0.95 ~ 1 | 45 |
| Silicon nitride | 6 | 0.98 ~ 1 | 30 |
|  | 4 | 0.96 ~ 1 | 32 |

It can clearly be seen prom Table 4 that the durability count tends to increase, but the welding current decreases only slightly, when the resistance welding electrode according to the present invention is used as an anode electrode and the conventional resistance welding electrode is used as a cathode electrode, and that when the filamentary members 3 are made of Ti or TiAl, the welding current tends to increase, thereby failing to resistance-weld the workpieces with a low current.

A second comparative example with respect to the above embodiments in which the aluminum-alloy plates are welded with a direct current by a cathode electrode comprising the resistance welding electrode according to the present invention and an anode electrode comprising the conventional resistance welding electrode will be described below.

In the second comparative example, the resistance welding electrode according to the present invention used in the first comparative example was used as each of cathode and anode electrodes, and plates of an aluminum alloy (A5182, thickness: 2 mm) were resistance-welded with a direct current under a pressure of 600 kgf by the resistance welding electrodes, and also by conventional resistance welding electrodes used as anode and cathode electrodes. Welding currents and durability counts were measured for comparison.

Table 5 shows the measured results of the second comparative example. In Table 5, the welding currents and the durability counts are given as ratios to those, set to "1", which were obtained when the aluminum-alloy plates were resistance-welded by the conventional resistance welding electrodes used as anode and cathode electrodes.

TABLE 5

| Material of filamentary members | Number of filamentary members | Welding current ratio | Durability count ratio |
|---|---|---|---|
| Fe | 6 | 1 | 8 |
|  | 4 | 1 | 9 |
| Ni | 6 | 1 | 11 |
|  | 4 | 1 | 14 |
| Ti | 6 | 1 | 2 |
|  | 4 | 1 | 1 |
| W | 6 | 1 | 15 |
|  | 4 | 1 | 18 |
| TiAl | 6 | 1 | 2 |
|  | 4 | 1 | 1 |
| Kaolinite | 6 | 1 | 30 |
|  | 4 | 1 | 35 |
| Silicon nitride | 6 | 1 | 15 |
|  | 4 | 1 | 18 |

It can clearly be seen from Table 5 that the durability count tends to increase, but the welding current does not decrease, when the resistance welding electrode according to the present invention is used as each of anode and cathode electrodes.

A sixth embodiment of the present invention will be described below.

In the sixth embodiment, as shown in FIG. 4, the resistance welding electrode 1 according to the first embodiment was used as one of the electrodes and the conventional resistance welding electrode 41 as the other electrode, and plates 42 of an aluminum alloy (A5052, O material, thickness: 1 mm) were welded with an alternating current by the resistance welding electrodes. The conventional resistance welding electrode.41 was made of a Cr—Cu alloy only, with no exposed material having a different electric conductivity on the tip end.

Figure 16:
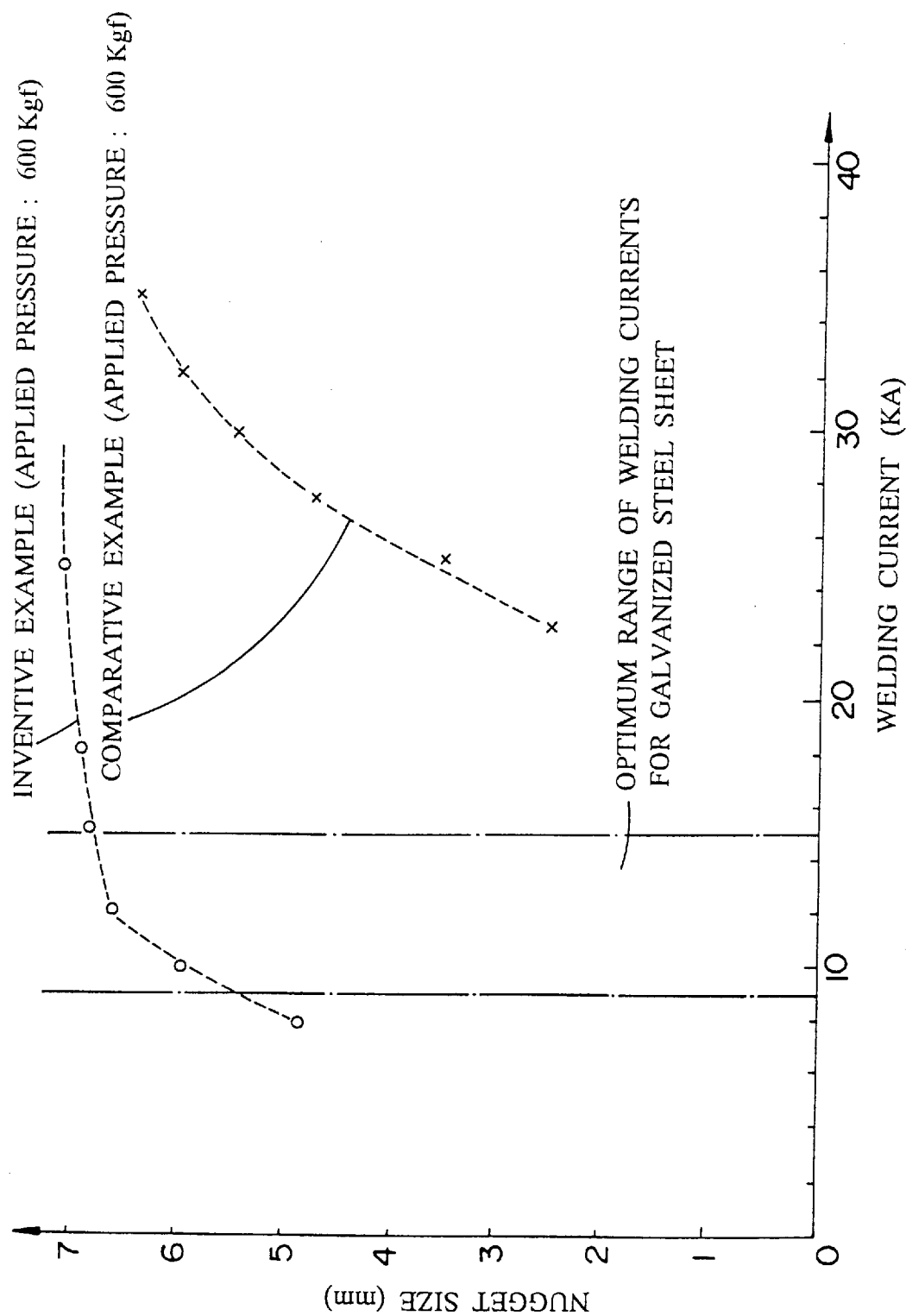
FIG. 16 is a graph showing the relationship between a welding current and a nugget size at the time metal plates are resistance-welded by a resistance welding electrode according to the present Invention with an alternating current that is supplied in 5 cycles.
Figure 17:
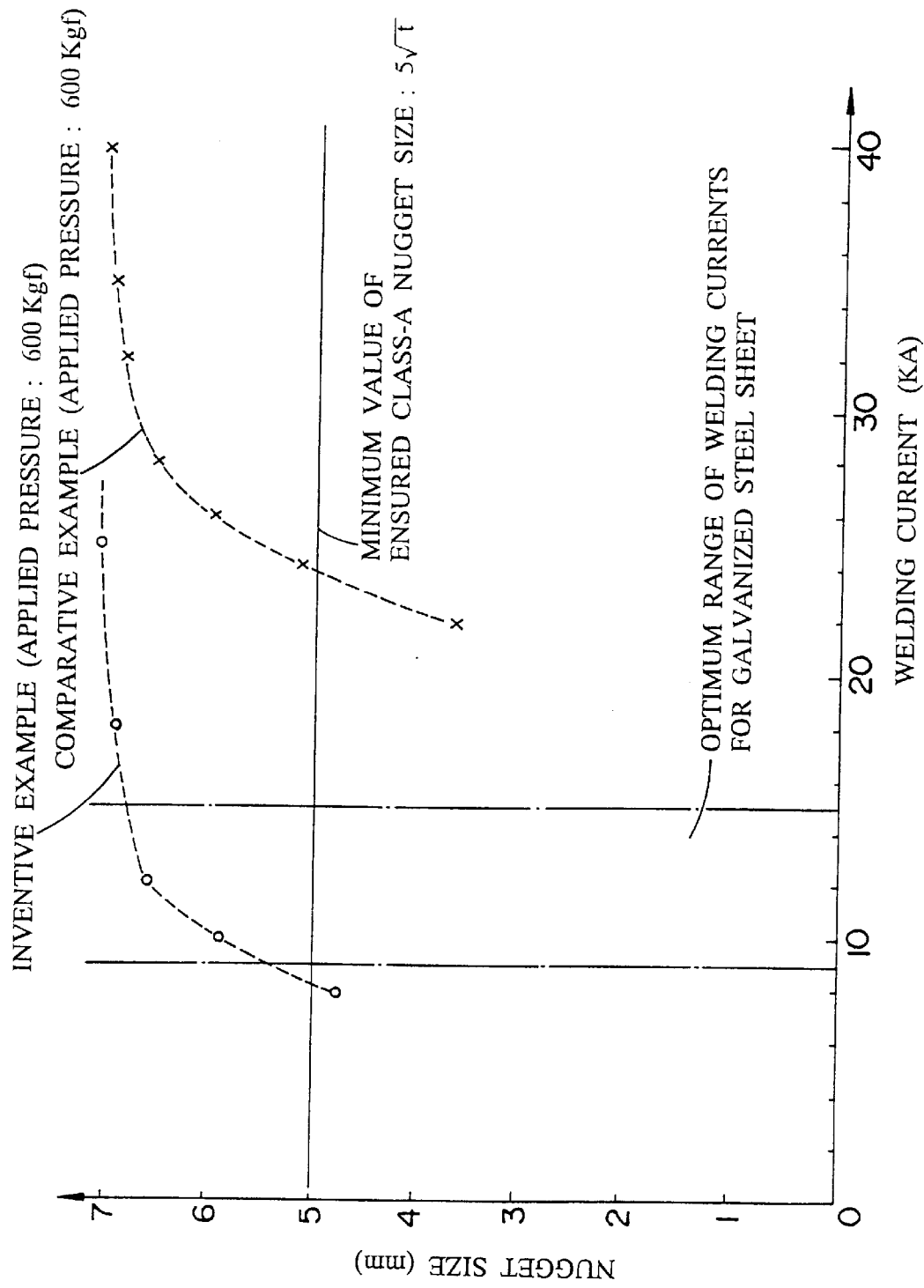
FIG. 17 is a graph showing the relationship between a welding current and a nugget size at the time metal plates are resistance-welded by the resistance welding electrode according to the present invention with an alternating current that is Supplied in 8 cycles.

The resistance welding electrodes 1 (with l=2 mm and L =6 mm in FIG. 1) were arranged as shown in FIG. 4, and the aluminum-alloy plates were resistance-welded by the resistance welding electrodes 1 with an alternating current. FIG. 16 shows the relationship between a welding current and a nugget size at the time the current is supplied in 5 cycles in the welding process, and FIG. 17 shows the relationship between a welding current and a nugget size at the time the current is supplied in 8 cycles in the welding process. The resistance welding electrodes 1 were pressed against the aluminum-alloy plates under a pressure of 600 Kgf. which is referred to as Inventive Example in FIGS. 16 and 17. In Comparative Example shown in FIGS. 16 and 17, aluminum-alloy plates were resistance-welded with an alternating current by anode and cathode electrodes which comprise conventional resistance welding electrodes 41 and were pressed against the metal plates under 600 Kgf.

It can be understood from FIGS. 16 and 17 that when the resistance welding electrode 1 and the conventional resistance welding electrode 41 are used to resistance-weld the aluminum-alloy plates with an alternating current, as described above, a nugget having an ensured class-A nugget size of $5t^{1/2}$ (t is the thickness of the aluminum-alloy plates) is produced with a lower current than when both electrodes comprise the conventional resistance welding electrodes 41. When the resistance welding electrode 1 and the conventional resistance welding electrode 41 are used to resistance-weld the aluminum-alloy plates with an alternating current, the aluminum-alloy plates can be welded with a welding current in the range of from 9 to 15 kA, which is an optimum range of welding currents for welding galvanized steel plates.

Figure 18:
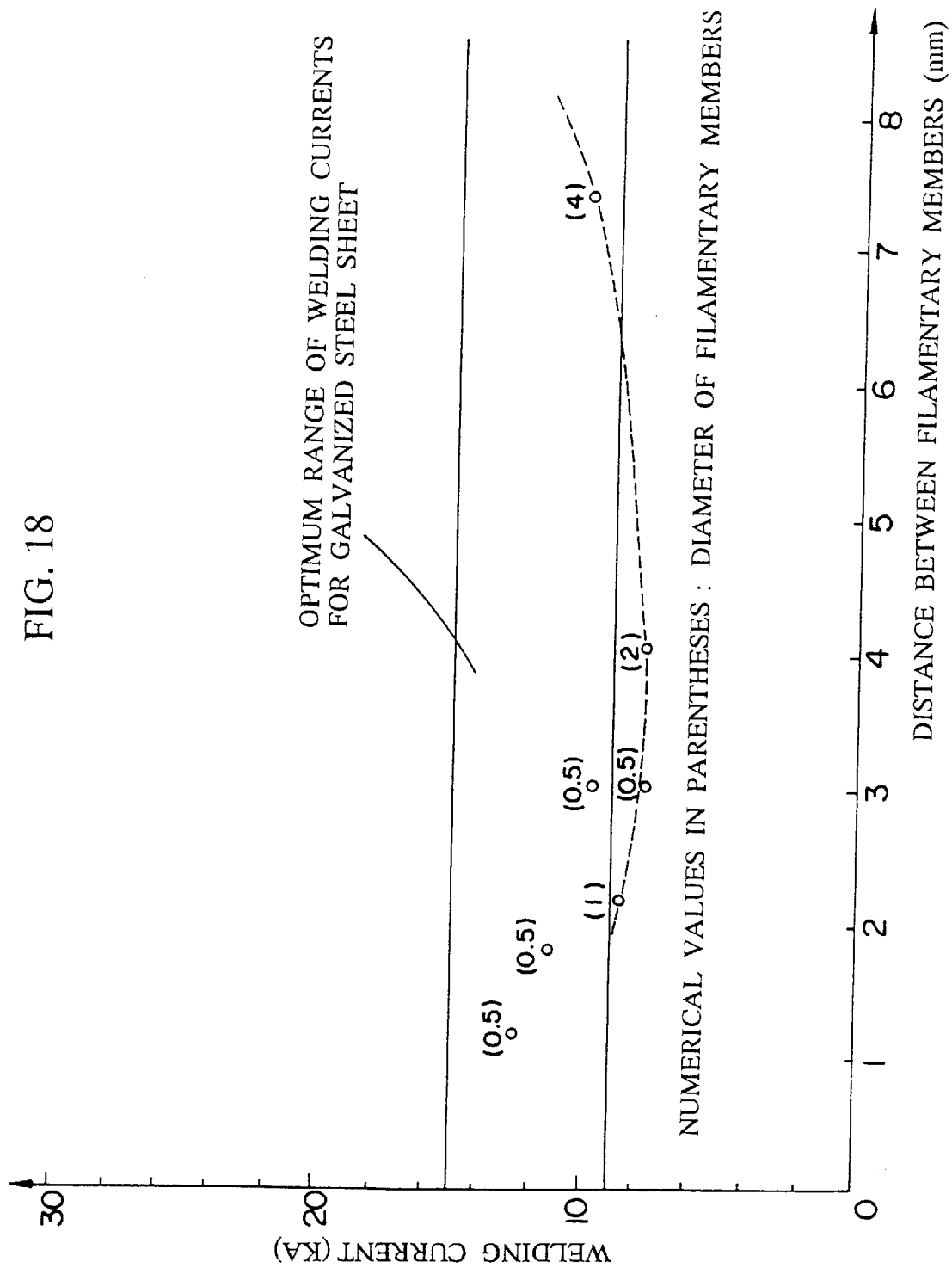
FIG. 18 is a graph showing the manner in which a welding current varies when the diameter of filamentary members shown in FIG. 1 and the distance between the filamentary members are varied at the time metal plates are resistance-welded by the resistance welding electrode according to the present invention with an alternating current.

FIG. 18 shows the manner in which the welding current varies when the diameter l of the filamentary members 3 and the distance L between the filamentary members 3 are varied at the time the aluminum-alloy plates are resistance-welded with an alternating current by the resistance welding electrode 1 used as one of the electrodes and the conventional resistance welding electrode 41 used as the other electrode as shown in FIG. 4. A study of FIG. 18 indicates that when the resistance welding electrode 1 is arranged as shown in FIG. 4 to resistance-weld the aluminum plates with an alternating current, it can weld the aluminum-alloy plates with a welding current in the range of from 9 to 15 kA, which is an optimum range of welding currents for welding galvanized steel plates, by selecting the diameter l of the filamentary members 3 and the distance L between the filamentary members 3.

A resistance welding electrode 1 having an electrode body as an electrode matrix made of a Cr—Cu alloy and a plurality of filamentary members 3 made of steel (SCM420)

embedded in the electrode body was manufactured as with the first embodiment. Sheets of an aluminum alloy (A5182, thickness: 2.5 mm) were welded with an alternating current by the resistance welding electrode 1 as one of the electrodes and the conventional resistance welding electrode as the other electrode. The same plates of an aluminum alloy were also welded with an alternating current by conventional resistance welding electrodes used as both electrodes. As a result of these resistance welding processes, ranges of currents and applied pressures optimum for resistance welding were compared.

Figure 19:
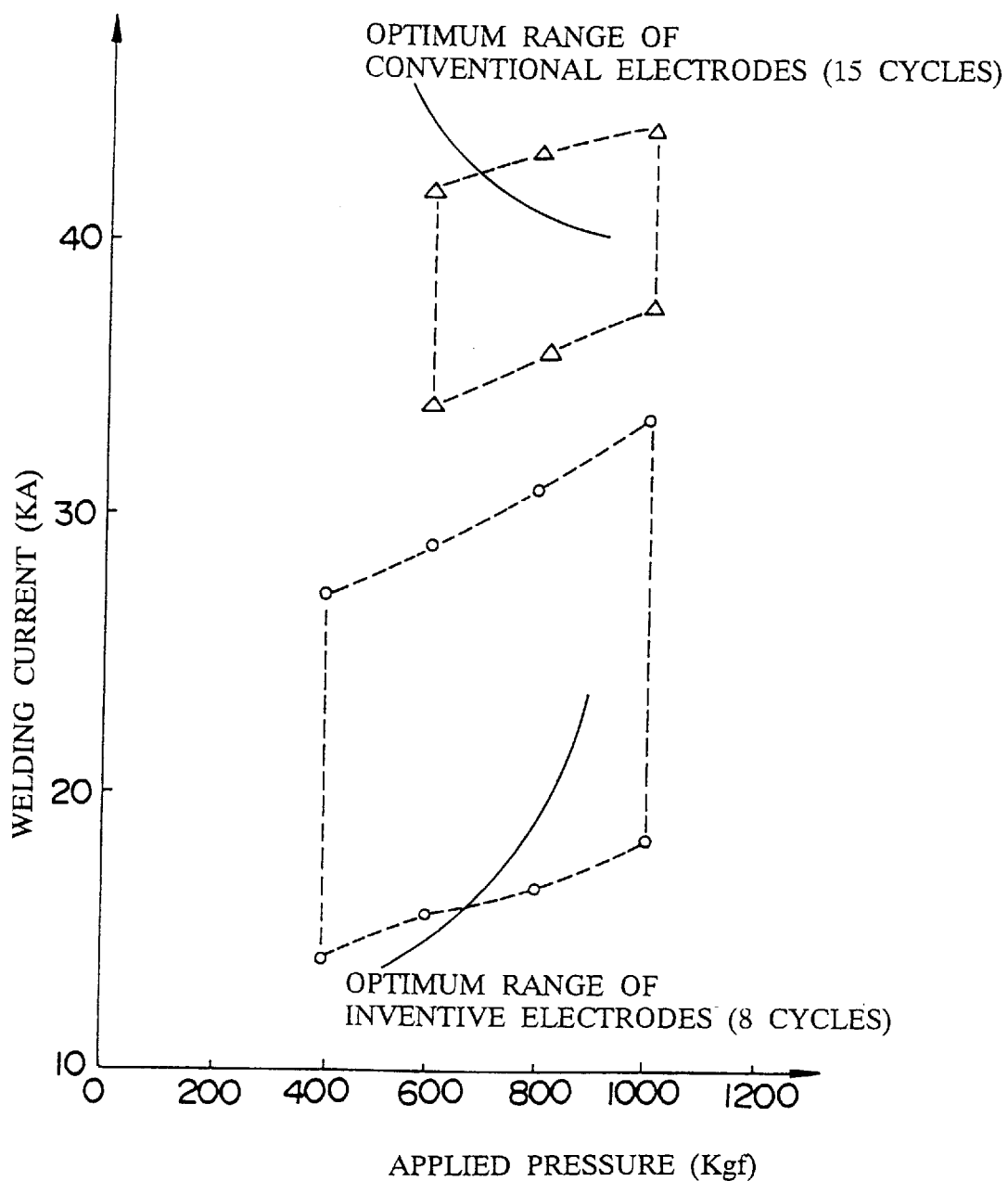
FIG. 19 is a graph showing an optimum range of welding conditions at the time metal plates are resistance-welded by the resistance welding electrode according to the present invention with an alternating current.

With the resistance welding electrode 1, the diameter l of each of the filamentary members 3 is 2 mm, and the total area of the exposed tip ends 3a of the filamentary members 3 is 20% of the area of the electrode matrix in the tip end 4 of the resistance welding electrode 1. The conventional resistance welding electrode 41 was made of a Cr—Cu alloy only, with no exposed material having a different electric conductivity on the tip end. FIG. 19 shows the ranges of currents and applied pressures optimum for resistance welding.

It can be seen from FIG. 19 that the aluminum-alloy plates can be welded by the resistance welding electrode 1 serving as one of the electrodes with a welding alternating current in the range of 13–34 kA in 8 cycles, and hence can be welded with a lower current in fewer cycles than by the conventional resistance welding electrodes 41 used as both electrodes because the aluminum-alloy plates can be welded by the conventional resistance welding electrodes 41 with a welding alternating current in the range of 34–45 kA in 15 cycles. Since the range of adequate resistance welding conditions is increased by the resistance welding electrode according 1, the aluminum-alloy plates can be welded by the resistance welding electrode 1 with a welding current in the range of from 9 to 15 kA, which is an optimum range of welding currents for welding galvanized steel plates. Therefore, aluminum-alloy plates can be welded on the same production line as galvanized steel plates.

If both of the electrodes for use with an alternating current were composed of the resistance welding electrodes according to the present invention, then such an example would be the same as the second comparative example in. which the cathode and anode electrodes for use with a direct current are composed of the resistance welding electrodes according to the present invention, and the welding current would not be reduced.

According to the embodiments of the present invention, since the tip ends of the resistance welding electrodes are of a spherical convex shape, they will not leave welding marks on workpieces when resistance-welding the workpieces, and the resistance-welded workpieces are of excellent appearance.

In each of the embodiments, the electrode matrix is made or a Cr—Cu alloy. However, the electrode matrix may be made of Cu only, or an alloy containing Cu e.g., an Ag—Cu alloy, a Cu—W—Ag alloy, a Cu—Cd alloy, a Cu—Zr alloy, a Cu—Zr—Cr alloy, a Cu—Nb alloy, a Cu—Cr—Nb alloy, or an $Al_2O_3$—Cu alloy.

Although certain preferred embodiments of the present invention has been shown and described in detail, it should be understood that various changes and modifications may be made therein without departing from the scope of the appended claims.

What is claimed is:

1. A resistance welding electrode for supplying a current to metal workpieces to weld the workpieces to each other, comprising:

an electrode matrix of copper alloy; and
   a plurality of rods embedded in said electrode matrix parallel to a direction in which a current flows therethrough, said rods having respective tip ends exposed as interior or outermost lands on a surface of a tip end of said electrode matrix, wherein selective adjacent rods are spaced at equal distances from each other throughout said electrode matrix, such that said interior or outermost exposed lands are each positioned on said tip end concurrently at (i) selective respective vertices of a plurality of equilateral triangles and at (ii) respective vertices of equilateral polygons containing six or more of said equilateral triangles;
   wherein said rods are made of a material having an electric conductivity different from that of said electrode matrix, and said exposed tip ends of the rods having a total area which is in a range of 0.5 to 40% of the entire area of the tip end of said electrode matrix.

2. A resistance welding electrode according to claim 1, wherein said rods are made of a material having an electric conductivity lower than that of said electrode matrix.

3. A resistance welding electrode according to claim 2, wherein said material having an electric conductivity lower than that of said electrode matrix comprises a material selected from the group consisting of silicon nitride, kaolinite, and alumina.

4. A resistance welding electrode according to claim 2, wherein said material having an electric conductivity lower than that of said electrode matrix comprises a material selected from the group consisting of a non-metallic inorganic material, an intermetallic compound, and a metal.

5. A resistance welding electrode according to claim 4, wherein said non-metallic inorganic material comprises a material selected from the group consisting of TiC and $TiB_2$.

6. A resistance welding electrode according to claim 4, wherein said intermetallic compound comprises a material selected from the group consisting of TiAl and $Ni_3Al$.

7. A resistance welding electrode according to claim 4, wherein said metal comprises a material selected from the group consisting of Fe, Ni, Cr, Co, V, Mo, Zr, Ti, and W.

8. A resistance welding electrode according to claim 1, wherein said rods are made of a material having an electric conductivity higher than that of said electrode matrix.

9. A resistance welding electrode according to claim 8, wherein said material having an electric conductivity higher than that of said electrode matrix comprises a material selected from the group consisting of Ag, Cu, and a sintered Cr—Cu alloy.

10. A resistance welding electrode according to claim 1, wherein said electrode comprises a cathode electrode, and further comprising means for supplying a direct current through said cathode electrode when said metal workpieces are resistance-welded.

11. A resistance welding electrode according to claim 1, further comprising means for supplying an alternating current through said electrode when the metal workpieces are resistance-welded.

12. A method of manufacturing a resistance welding electrode for supplying a current to metal workpieces to weld the workpieces to each other, comprising the steps of:

shaping an electrode matrix as a cylinder having a diameter greater than the resistance welding electrode;
   defining a plurality of holes in said electrode matrix parallel to a direction in which a current flows therethrough such that the total cross-sectional area of said holes is in the range of 0.5 to 40% of the cross-sectional area of the electrode matrix after the resistance welding electrode is formed, wherein selective holes of said plurality of holes are spaced at equal distances from each other throughout said electrode matrix, filling a powder of a material having an electric conductivity different from that of said electrode matrix in said plurality of holes thereby to form an electrode blank;

drawing said electrode blank until the electrode blank has a predetermined diameter; and shaping the drawn electrode blank into a predetermined electrode configuration, wherein said powder forms respective exposed interior or outermost lands on a surface of a tip end of said electrode matrix, such that said interior and outermost exposed lands are each positioned on said tip end concurrently at (i) selective respective vertices of a plurality of equilateral triangles and at (ii) respective vertices of equilateral polygons containing six or more of said equilateral triangles.

13. A method of manufacturing a resistance welding electrode for supplying a current to metal workpieces to weld the workpieces to each other, comprising the steps of:

shaping an electrode matrix as a cylinder having a diameter greater than the resistance welding electrode;

defining a plurality of holes in said electrode matrix parallel to a direction in which a current flows therethrough such that the total cross-sectional area of said holes is in the range of 0.5 to 40% of the cross-sectional area of the electrode matrix after the resistance welding electrode is formed, wherein selective holes of said plurality of holes are spaced at equal distances from each other throughout said electrode matrix;

inserting a plurality of rods of a material having an electric conductivity different from that of said electrode matrix respectively into said holes thereby to form an electrode blank;

drawing said electrode blank until the electrode blank has a predetermined diameter; and shaping the drawn electrode blank into a predetermined electrode configuration, wherein said rods form respective exposed interior and outermost lands on a surface of a tip end of said electrode matrix, such that said interior and outermost exposed lands are positioned on said tip end concurrently at (i) selective respective vertices of a plurality of equilateral triangles and at (ii) respective vertices of equilateral Polygons containing six or more of said equilateral triangles.

14. A method according to claim 13, wherein said rods are produced by pressing to shape a powder of the material having an electric conductivity different from that of said electrode matrix.

15. A method according to claim 13, wherein said rods are produced by pressing to shape a powder of the material having an electric conductivity different from that of said electrode matrix, and thereafter sintering the powder.

16. A method according to claim 13, wherein said rods are produced by pressing to melting a powder of the material having an electric conductivity different from that of said electrode matrix, and thereafter casting the melted powder.

17. A resistance welding electrode according to claim 1, having equal areas of electrode matrix surrounding said exposed lands over the entire surface of the electrode tip.

18. A welding apparatus for resistance welding, having a single electrode according to claim 1.

* * * * *